US012795209B2

(12) United States Patent
Yamagishi

(10) Patent No.: US 12,795,209 B2
(45) **Date of Patent: *Nov. 10, 2026**

(54) INFORMATION PROCESSING APPARATUS, INFORMATION PROCESSING APPARATUS, AND PROGRAM

(71) Applicant: SATURN LICENSING LLC, New York, NY (US)

(72) Inventor: Yasuaki Yamagishi, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/313,259

(22) Filed: May 5, 2023

(65) Prior Publication Data

US 2023/0276105 A1 Aug. 31, 2023

Related U.S. Application Data

(63) Continuation of application No. 16/975,286, filed as application No. PCT/JP2019/008140 on Mar. 1, 2019, now Pat. No. 11,689,776.

(30) Foreign Application Priority Data

Mar. 15, 2018 (JP) ................................ 2018-048032

(51) Int. Cl.
*H04N 21/488* (2011.01)
*G10L 15/22* (2006.01)
(Continued)

(52) U.S. Cl.
CPC ........... *H04N 21/488* (2013.01); *G10L 15/22* (2013.01); *G11B 27/005* (2013.01); (Continued)

(58) Field of Classification Search
CPC ....... H04N 21/42203; H04N 21/43074; H04N 21/4316; H04N 21/435; H04N 21/488; H04N 21/8126; H04N 21/84
See application file for complete search history.

(56) References Cited

U.S. PATENT DOCUMENTS 6,151,017 A 11/2000 Suzuoka et al.
8,196,168 B1 6/2012 Bryan et al.
(Continued)

FOREIGN PATENT DOCUMENTS

CN 105379302 A 3/2016
JP 2002-369180 A 12/2002
(Continued)

OTHER PUBLICATIONS

Combined Chinese Office Action and Search Report issued Apr. 26, 2022 in Patent Application No. 201980018039.7 (with English language translation), 17 pages.
(Continued)

*Primary Examiner* — Rong Le
(74) *Attorney, Agent, or Firm* — Oblon, McClelland, Maier & Neustadt, L.L.P.

(57) ABSTRACT

This information processing apparatus includes: an AV decoder 41 that acquires and reproduces video data including a service object, for which a service that processes a request from a user through voice is available; and an application execution environment 43 that adds an additional image for informing the user about the service object to the reproduced video. The additional image includes a visual feature unique to each service object such that the service object is uniquely determined by voice recognition in the service.

19 Claims, 20 Drawing Sheets

(51) Int. Cl.

| | |
|---|---|
| ***G11B 27/00*** | (2006.01) |
| ***H04N 21/422*** | (2011.01) |
| ***H04N 21/43*** | (2011.01) |
| ***H04N 21/435*** | (2011.01) |
| ***H04N 21/81*** | (2011.01) |

(52) U.S. Cl.

CPC . *H04N 21/42203* (2013.01); *H04N 21/43074* (2020.08); *H04N 21/435* (2013.01); *H04N 21/8126* (2013.01); *G10L 2015/223* (2013.01)

(56) References Cited

U.S. PATENT DOCUMENTS

| | | | | |
|---|---|---|---|---|
| 8,843,953 | B1 | 9/2014 | Dang | |
| 9,883,249 | B2 | 1/2018 | Taylor | |
| 2009/0094637 | A1* | 4/2009 | Lemmons | H04N 21/23418 725/40 |
| 2012/0308202 | A1 | 12/2012 | Murata et al. | |
| 2012/0324518 | A1 | 12/2012 | Thomas et al. | |
| 2013/0223813 | A1 | 8/2013 | Kunigita et al. | |
| 2014/0028780 | A1 | 1/2014 | Croen | |
| 2014/0089423 | A1 | 3/2014 | Jäckels | |
| 2015/0150031 | A1* | 5/2015 | Gibbon | H04N 21/4223 725/12 |
| 2016/0127798 | A1* | 5/2016 | Yamagishi | H04N 21/6332 725/110 |
| 2016/0156944 | A1 | 6/2016 | Shinobu et al. | |
| 2016/0381412 | A1* | 12/2016 | Couleaud | H04N 21/4223 725/46 |
| 2016/0381427 | A1* | 12/2016 | Taylor | H04N 21/472 725/13 |
| 2018/0098101 | A1* | 4/2018 | Pont | H04N 21/4147 |
| 2020/0099984 | A1* | 3/2020 | Seo | H04N 21/47815 |

FOREIGN PATENT DOCUMENTS

| | | | |
|---|---|---|---|
| JP | 2012-249156 | A | 12/2012 |
| JP | 2015-22310 | A | 2/2015 |
| JP | 2015-154195 | A | 8/2015 |
| KR | 10-2013-0062371 | A | 6/2013 |
| WO | WO 2017/135133 | A1 | 8/2017 |

OTHER PUBLICATIONS

International Search Report issued on May 28, 2019 in PCT/JP2019/008140 filed on Mar. 1, 2019 (2 pages).

* cited by examiner

POI metadata

- POI icon image
- POI presentation color
- POI presentation position
- PPOI presentation text
- POI filtering information
  - Identification name of user demographic class
  - User identification information

INFORMATION PROCESSING APPARATUS, INFORMATION PROCESSING APPARATUS, AND PROGRAM

CROSS REFERENCE TO RELATED APPLICATION

This is a continuation of application Ser. No. 16/975,286, filed Aug. 24, 2020, which is a National Stage Application of International Application No. PCT/JP2019/008140, filed on Mar. 1, 2019, which is based on Japanese Patent Application No. 2018-048032, filed on Mar. 15, 2018, with the Japan Patent Office, the entire contents of each of which are hereby incorporated by reference.

TECHNICAL FIELD

The present technology relates to an information processing apparatus, an information processing apparatus, and a program that perform information processing for receiving and reproducing moving image content including videos, and particularly, to an information processing apparatus, an information processing method, and a program that are suitable for, for example, a case where the moving image content works with a voice-based information service for a user of the information processing apparatus.

BACKGROUND ART

Voice artificial intelligence (AI) assistant services have been recently prevailing. Those services are information services in which a terminal supporting the services picks up a request through voice made by a user of an information processing apparatus by using a microphone or the like, recognizes the request, analyzes data, executes a service corresponding to the request of the user, and responds to the user for a result of the execution through sound or the like (see, for example, Patent Literature 1). Alexa (registered trademark) of Amazon Echo (registered trademark) is currently known as a voice AI assistant service based on cloud.

CITATION LIST

Patent Literature

Patent Literature 1: Japanese Patent Application Laid-open No. 2015-022310

DISCLOSURE OF INVENTION

Technical Problem

The inventors of the present technology have examined a mechanism in which the voice AI assistant service as described above is used as means for collecting information regarding people or products appearing in a video in an environment where moving image content including the video is reproduced. For example, in a case where a user as a viewer wants to know then and there various things such as a role of a person appearing in the moving image content, a relationship with other people appearing therein, and further the profile of the actor who acts that person, the user can receive information from the voice AI assistant service in real time.

However, if the voice AI assistant service is actually used as means for collecting information regarding people or products appearing in a video in an environment where moving image content including the video is reproduced, a suitable way of using the voice AI assistant service while making use of the properties of the voice AI assistant service has not yet established sufficiently, and problems to be solved are stacked.

In this regard, the present technology has an object to provide an information processing apparatus, an information processing apparatus, and a program, which are capable of using a voice AI assistant service while making use of the properties thereof when a reproduced video is viewed.

Solution to Problem

In order to solve the problems described above, an information processing apparatus according to the present technology includes: a media reproduction unit that acquires and reproduces video data including a service object, for which a service that processes a request from a user through voice is available; and a controller that adds an additional image for informing the user about the service object to the reproduced video.

The additional image may include a visual feature unique to each service object such that the service object is uniquely determined by voice recognition in the service.

The additional image may be presented at a position attached to the service object.

The controller may be configured to restrict the service object, to which the additional image is added, in accordance with the user or an attribute of the user.

The controller may be configured to perform a skip reproduction of a video of a period in which the service object appears, the additional image being added to the service object in accordance with the user or the attribute of the user.

The controller may be configured to reproduce the video of the period in which the service object appears, at a first double-speed, the additional image being added to the service object in accordance with the user or the attribute of the user, and reproduce a video of a period in which the service object does not appear, at a second speed faster than the first double-speed.

The controller may be configured to acquire metadata for generating the additional information, and add the additional information on the basis of the acquired metadata.

The controller may be configured to acquire an MPD file including AdaptationSet of the metadata, analyze the MPD file, acquire each of the video data and the metadata as a Media Segment of MPEG-DASH, and present the video data and the additional image based on the metadata in synchronization with each other.

The controller may be configured to determine whether a change in details is present or not between temporally preceding metadata and temporally succeeding metadata on the basis of version information of the metadata, and in a case where a change in details is absent, add the additional image, which is added to the video on the basis of the temporally preceding metadata, to a video synchronized with the temporally succeeding metadata, as an additional image based on the temporally succeeding metadata.

Additionally, the visual feature of the additional image may be provided by any one of a character string regarding the service object, a color, a shape, or an icon.

An information processing method of another embodiment according to the present technology includes the procedure of: acquiring and reproducing video data including a service object, for which a service that processes a request from a user through voice is available; and adding an additional image for informing the user about the service object to the reproduced video.

A program of still another embodiment according to the present technology causes a computer to function to, when the computer reproduces video data including a service object, for which a service that processes a request from a user through voice is available, add an additional image for informing the user about the service object to the reproduced video.

Advantageous Effects of Invention

As described above, according to the present technology, it is possible to use a voice AI assistant service while making use of the properties thereof when a reproduced video is viewed.

MODE(S) FOR CARRYING OUT THE INVENTION

Hereinafter, an embodiment according to the present technology will be described.

<Summary of Information Processing Apparatus of Embodiment>

An information processing apparatus 4 of this embodiment includes:

an AV decoder 41 that acquires and reproduces video data including a service object, for which a voice AI assistant service that processes a request from a user through voice is available; and an application execution environment 43 that adds an additional image for informing the user about the service object to the reproduced video.

With this configuration, the information processing apparatus 4 of this embodiment exerts an effect of allowing a service object for the voice AI assistant service to be determined at a glance in the reproduced video and eliminating confusion caused when the service object is selected.

First Embodiment

Next, a configuration and an operation of the information processing system 100 including the information processing apparatus 4 of the first embodiment will be described in detail.

(Overall Configuration of System)

Figure 1:
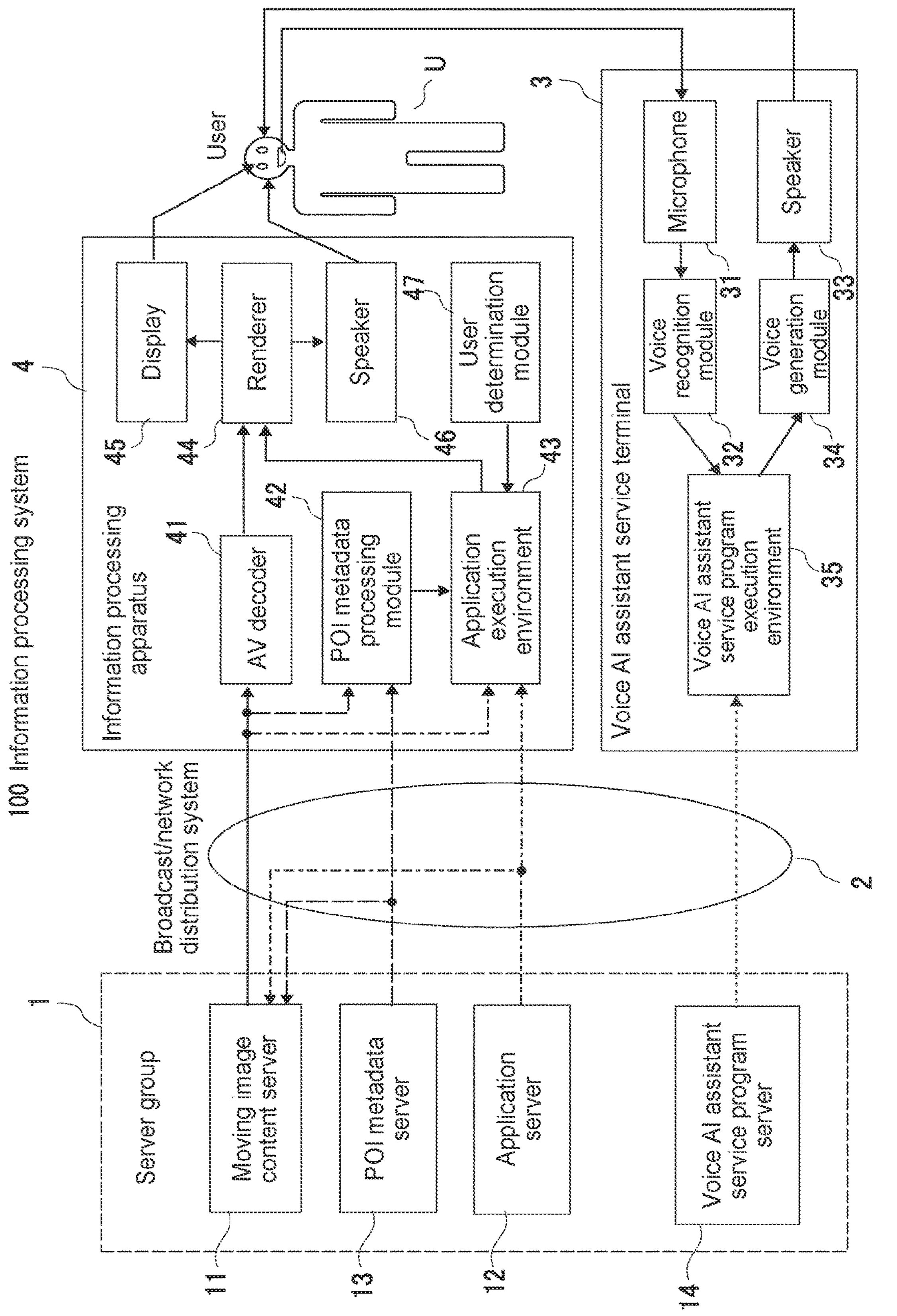
FIG. 1 is a block diagram showing an overall configuration of an information processing system 100 including an information processing apparatus 4 of a first embodiment according to the present technology.

FIG. 1 is a block diagram showing an overall configuration of an information processing system 100 including an information processing apparatus 4 of a first embodiment according to the present technology.

As shown in the figure, the information processing system 100 includes a server group 1, a broadcast/network distribution system 2, a voice AI assistant service terminal 3, and an information processing apparatus 4 of a user.

(Regarding Server Group 1)

The server group 1 includes a moving image content server 11, an application server 12, a POI metadata server 13, and a voice AI assistant service program server 14.

The moving image content server 11 accumulates data of moving image content such as commercial messages (CMs) and programs. The data of moving image content may be multimedia data configured by a plurality of kinds of media data such as video, audio, and subtitles. The present technology is applicable particularly to video data, and it does not matter whether other media data such as audio and subtitles is present or not.

The POI metadata server 13 directly distributes POI metadata corresponding to the moving image content to the information processing apparatus 4 via the broadcast/network distribution system 2. Alternatively, in a case where at least the data of the moving image content and the POI metadata are gathered in a predetermined data structure in the moving image content server 11 and then distributed to the information processing apparatus 4, the POI metadata server 13 supplies the POI metadata to the moving image content server 11 via the broadcast/network distribution system 2. The POI metadata will be described later.

The application server 12 directly distributes an application for executing processing based on the POI metadata in the information processing apparatus 4, to the information processing apparatus 4 via the broadcast/network distribution system 2. Alternatively, in a case where the data of the moving image content, the POI metadata, and the application are gathered in a predetermined data structure in the moving image content server 11 and then distributed to the information processing apparatus 4, the application server 12 supplies the application to the moving image content server 11 via the broadcast/network distribution system 2.

The voice AI assistant service program server 14 supplies a voice AI assistant service program to the voice AI assistant service terminal 3 via the broadcast/network distribution system 2. The voice AI assistant service program is a program configured to generate a service execution result in response to a service request, which is provided by a user U who is a viewer of the moving image content, for a service object such as a specific person or product appearing in the moving image content.

The broadcast/network distribution system 2 is a system to distribute the data of the moving image content, the data structure in which the data of the moving image content and the POI metadata are gathered, or the data structure in which the data of the moving image content, the POI metadata, and the application are gathered, to the information processing apparatus 4 via broadcasting or network communication.

Additionally, the broadcast/network distribution system 2 is also used for data transfer between the moving image content server 11, the application server 12, and the POI metadata server 13, and further data transfer between the voice AI assistant service program server 14 and the voice AI assistant service terminal 3.

(Regarding Information Processing Apparatus 4)

The information processing apparatus 4 includes, as hardware elements, a central processing unit (CPU), a main memory such as a random access memory (RAM), storage devices such as a hard disk drive (HDD) and a solid state drive (SSD), a user interface, a broadcast reception unit such as an antenna and a broadcast tuner, and a communication interface such as a network interface. The information processing apparatus 4 may be specifically information terminals wearable by the user, such as a personal computer, a smartphone, a tablet terminal, a television, a game device, and a head mounted display (HMD).

The information processing apparatus 4 includes, as functional elements achieved by the hardware elements described above and software elements, an AV decoder 41, a POI metadata processing module 42, an application execution environment 43, and a renderer 44.

The information processing apparatus 4 includes, as user interfaces, a display 45 and a speaker 46. Furthermore, the information processing apparatus 4 may include a user determination module 47 as a functional element.

The AV decoder 41 decodes multimedia data (video data, audio data, and the like) of the moving image content acquired from the moving image content server 11 via the broadcast/network distribution system 2.

The POI metadata processing module 42 supplies the POI metadata, which is acquired from the moving image content server 11 or the POI metadata server 13 via the broadcast/network distribution system 2, to the application execution environment 43.

The "POI metadata" is metadata for adding an added image to a video being reproduced in the information processing apparatus 4, the added image informing the user U of the information processing apparatus 4 about a specific service object, to which a voice AI assistant service is assigned in that video. The POI is an abbreviation for Point of Interest. The "specific service object" means a person or product appearing in the video, for which the voice AI assistant service can respond to a service request from the user U.

The application execution environment 43 is an environment where a native application or a web application is executed using the CPU and the main memory. The application execution environment 43 generates an added image, which is to be added to the service object in the video, on the basis of the POI metadata provided by the POI metadata processing module 42. The "added image" is generated, for example, as a "speech balloon", such that a relationship with the service object in the video is easily understandable, for example. However, the present technology is not limited to the above, and any image with which a relationship with the service object in the video is easily understandable may be used.

The renderer 44 generates a display signal, which is to be output to the display 45, from video data decoded by the AV decoder 41, and outputs audio data decoded by the AV decoder 41 to the speaker 46. Additionally, in a case where an added image is supplied from the application execution environment 43, the renderer 44 synthesizes that added image on the video of the program.

The display 45 presents the video to the user U. The speaker 46 presents the audio to the user U.

(Regarding Voice AI Assistant Service Terminal 3)

The voice AI assistant service terminal 3 is a terminal that provides a voice assistant service to the user U of the information processing apparatus 4. More specifically, the voice AI assistant service terminal 3 is an apparatus capable of receiving a service request, which is provided by the user U through voice, for an optional service object in the video, executing that service, and returning an execution result of the service to the user U by using sound or the like. Here, the service request from the user U through voice is provided using, for example, words in the form of question, and an execution result of the service is returned to the user U by, for example, synthesized voice in the form of response or the like.

The voice AI assistant service terminal 3 includes a microphone for assistant service 31, a voice recognition module 32, a speaker for voice AI assistant service 33, a voice generation module 34, and a voice AI assistant service program execution environment 35.

The microphone for assistant service 31 captures the service request provided through voice from the user U of the information processing apparatus 4.

The voice recognition module 32 recognizes the voice of the service request captured by the microphone for assistant service 31 and passes request data to the voice AI assistant service program execution environment 35.

The voice AI assistant service program execution environment 35 is an environment where the voice AI assistant service program acquired from the voice AI assistant service program server 14 is executed. The voice AI assistant service program execution environment 35 generates data of an execution result of the service for the request data, which is supplied from the voice recognition module 32, and supplies the data to the voice generation module 34.

The voice generation module 34 converts the data of the execution result of the service, which is supplied from the voice AI assistant service program execution environment 35, into synthesized voice.

The speaker for assistant service 33 presents the synthesized voice, which is supplied from the voice generation module 34, to the user U of the information processing apparatus 4.

(Overall Operation Flow (Part 1) of Information Processing System)

Figure 2:
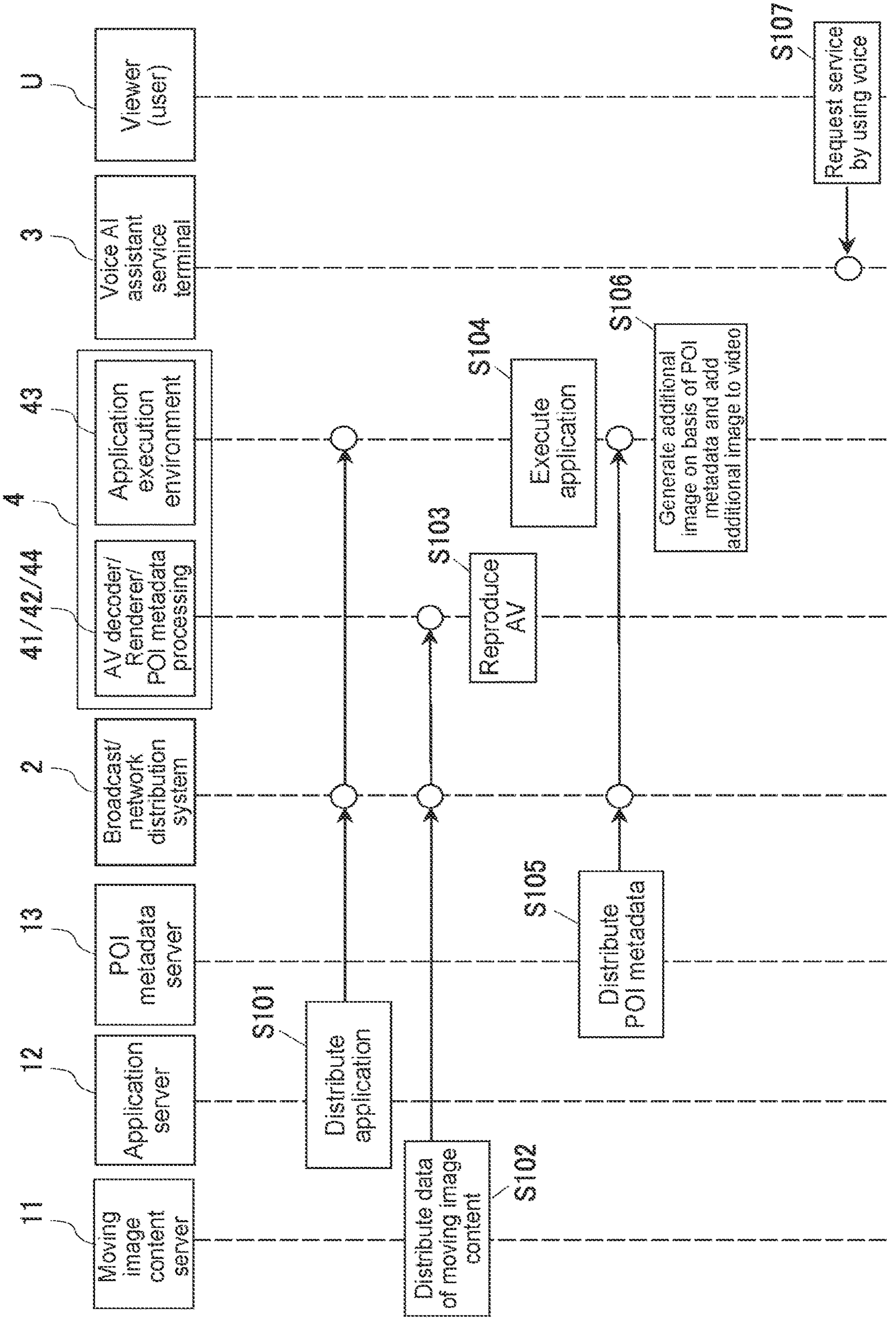
FIG. 2 is a sequence diagram showing an overall operation flow (part 1) of the information processing system 100 of FIG. 1.

FIG. 2 is a sequence diagram showing the overall operation flow (part 1) of the information processing system 100 in this embodiment.

It is assumed that the data of the moving image content, the application, and the POI metadata are respectively distributed from different servers (moving image content server 11, application server 12, and POI metadata server 13).

First, the application is distributed from the application server 12 to the information processing apparatus 4 via the broadcast/network distribution system 2 (Step S101). Furthermore, the data of the moving image content is distributed from the moving image content server 11 to the information processing apparatus 4 via the broadcast/network distribution system 2 (Step S102). In the information processing apparatus 4, the received data of the moving image content is decoded in the AV decoder 41, and the resultant video data and audio data are respectively supplied to the display 45 and the speaker 46 via the renderer 44 (Step S103).

Additionally, the application distributed from the application server 12 to the information processing apparatus 4 is installed in the application execution environment 43, and the application is executed (Step S104).

Next, the POI metadata corresponding to the moving image content is distributed from the POI metadata server 13 to the information processing apparatus 4 via the broadcast/network distribution system 2 (Step S105). In the information processing apparatus 4, the POI metadata is supplied to the application execution environment 43 by the POI metadata processing module 42. The application execution environment 43 generates, on the basis of the POI metadata, an additional image for informing the user U about a service object in the video, and supplies the additional image to the renderer 44. Thus, a synthesized image in which the additional image is superimposed on the video of the program is obtained and displayed on the display 45 (Step S106).

The user U then provides a service request, through voice, for the service object for which the additional image is presented in the video displayed on the display 45, to the voice AI assistant service terminal 3, and uses the voice AI assistant service (Step S107).

(Overall Operation Flow (Part 2) of Information Processing System)

Figure 3:
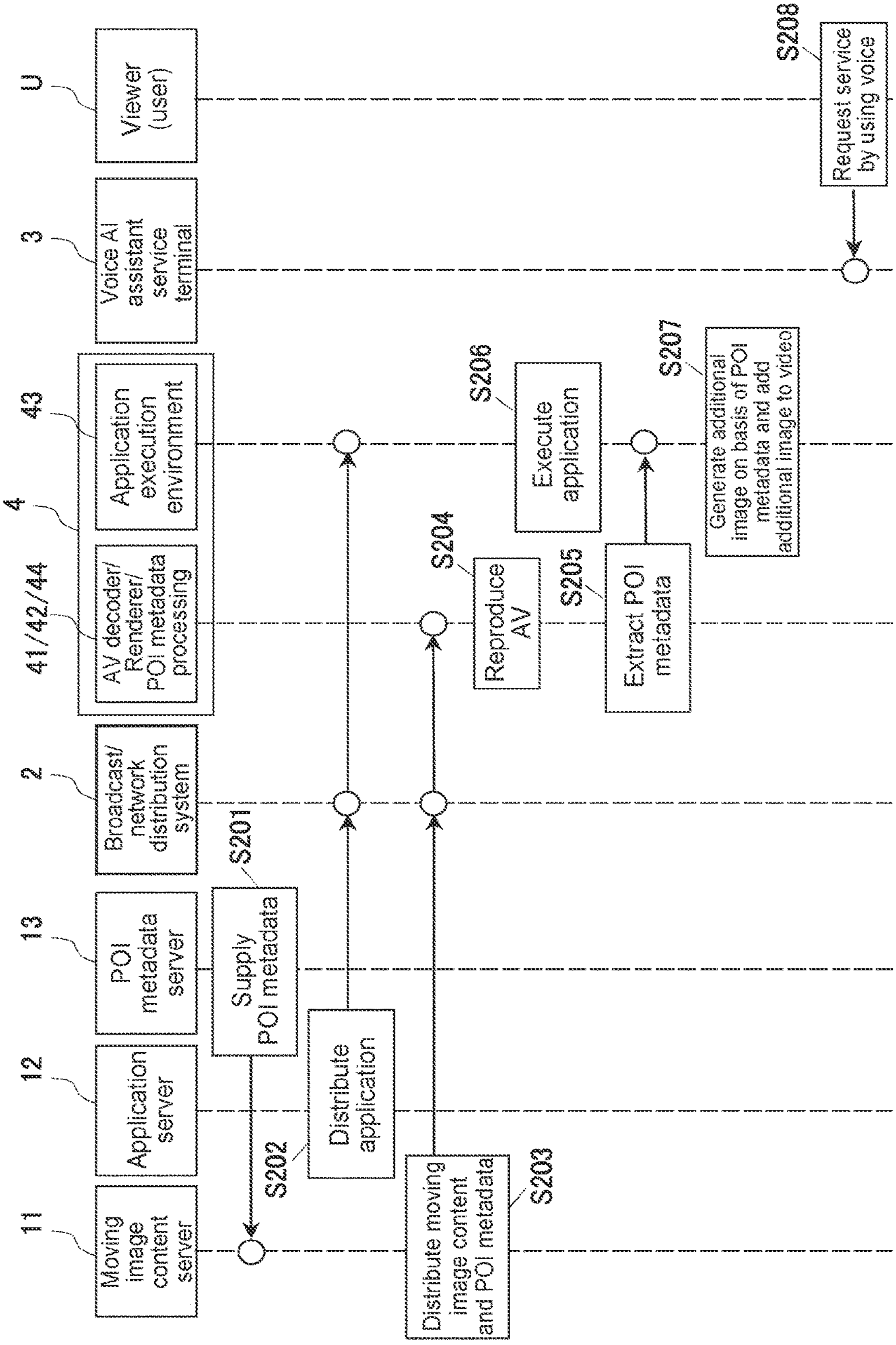
FIG. 3 is a sequence diagram showing an overall operation flow (part 2) of the information processing system 100 of FIG. 1.

FIG. 3 is a sequence diagram showing the overall operation flow (part 2) of information processing system 100 in this embodiment.

In the operation flow (part 1) described above, the data of the moving image content and the POI metadata are distributed from the different servers (moving image content server 11 and POI metadata server 13) to the information processing apparatus 4, and thus the synchronization between the data of the moving image content and the POI metadata is not ensured in the information processing apparatus 4.

In this regard, in the operation flow (part 2) shown in FIG. 3, first, the POI metadata is supplied from the POI metadata server 13 to the moving image content server 11 via the broadcast/network distribution system 2 (Step S201). Subsequently, the POI metadata and the data of the moving image content are gathered in a predetermined data structure in the moving image content server 11 and are distributed to the information processing apparatus 4 via the broadcast/network distribution system 2 (Step S203).

In the information processing apparatus 4, the data of the moving image content is extracted from the received data structure, the extracted data of the moving image content is decoded in the AV decoder 41, and the resultant video data and audio data are respectively supplied to the display 45 and the speaker 46 via the renderer 44 (Step S204).

Additionally, in the information processing apparatus 4, the POI metadata is extracted from the received data structure by the POI metadata processing module 42 (Step S205) and is supplied to the application execution environment 43. The application execution environment 43 generates, on the basis of the POI metadata, an additional image for informing the user U about a service object in the video, and supplies the additional image to the renderer 44. Thus, a synthesized image in which the additional image is superimposed on the video of the program is obtained and displayed on the display 45 (Step S207).

The user U then provides a service request, through voice, for the service object for which the additional image is presented in the video displayed on the display 45, to the voice AI assistant service terminal 3, and uses the voice AI assistant service (Step S208).

In such a manner, the POI metadata and the data of the moving image content are gathered in a predetermined data structure and distributed from the moving image content server 11 to the information processing apparatus 4, which ensures that the data of the moving image content and the POI metadata can be processed in synchronization with each other in the information processing apparatus 4. This allows a correct additional image to be constantly added to the service object in the video of the program and allows a stable voice AI assistant service to be maintained.

Note that, in the operation flow (part 2), the application is distributed from the application server 12 to the information processing apparatus 4 via the broadcast/network distribution system 2 (Step S202), installed in the application execution environment 43, and executed (Step S206), which is the same as the operation flow (part 1) described above.

(Overall Operation Flow (Part 3) of Information Processing System)

Figure 4:
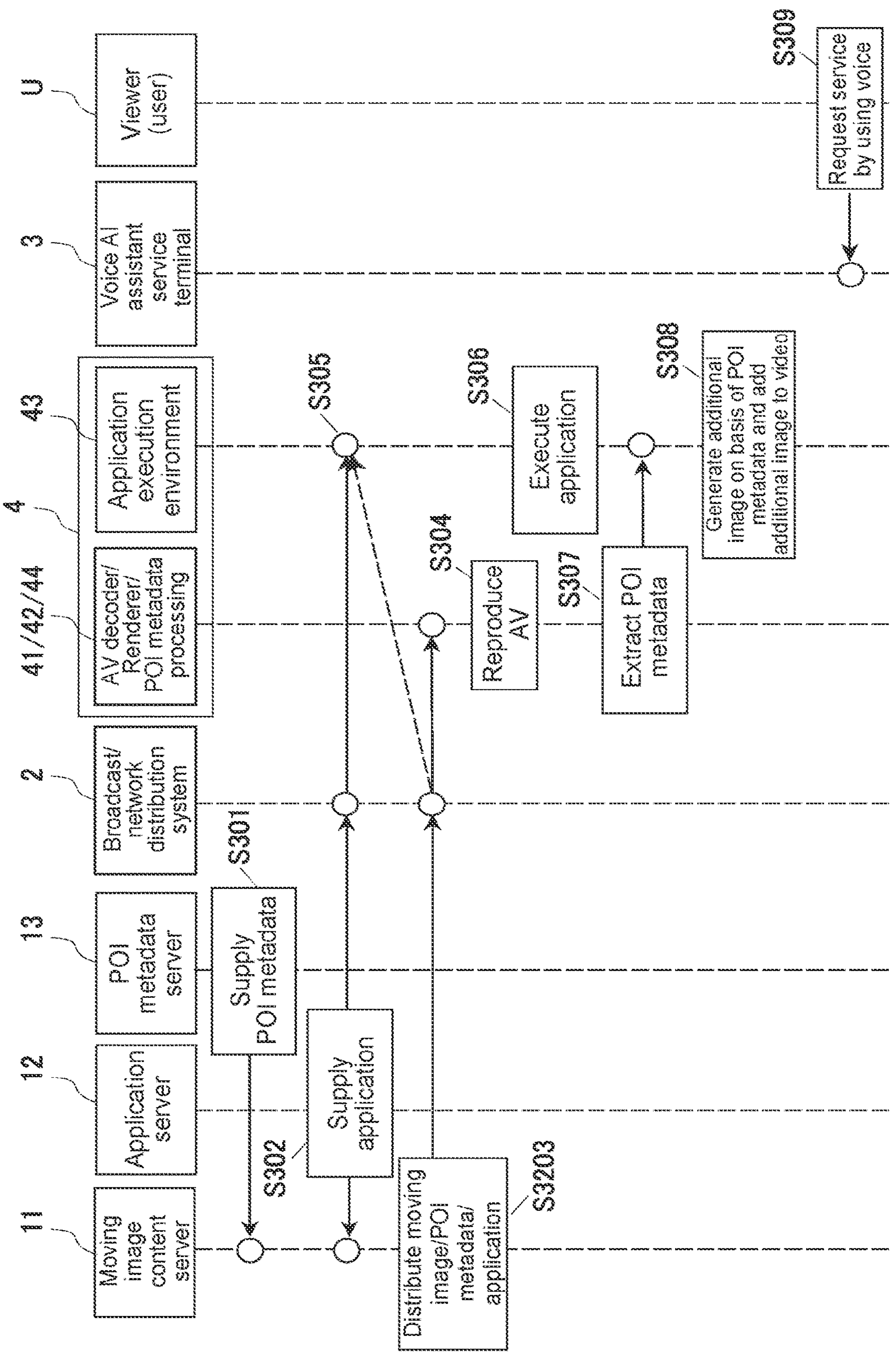
FIG. 4 is a sequence diagram showing an overall operation flow (part 3) of the information processing system 100 of FIG. 1.

FIG. 4 is a sequence diagram showing the overall operation flow (part 3) of the information processing system 100 in this embodiment.

In this operation flow, it is assumed that the data of the moving image content, the POI metadata, and the application that processes them are gathered in a predetermined data structure and distributed from the moving image content server 11 to the information processing apparatus 4.

First, the POI metadata is supplied from the POI metadata server 13 to the moving image content server 11 (Step S301). Furthermore, the application is supplied from the application server 12 to the moving image content server 11 (Step S302). The order of the supply of the POI metadata and the supply of the application may be reversed. Subsequently, the data of the moving image content, the POI metadata, and the application are gathered in a predetermined data structure in the moving image content server 11 and are distributed to the information processing apparatus 4 via the broadcast/network distribution system 2 (Step S303).

In the information processing apparatus 4, the data of the moving image content is extracted from the received data structure, the extracted data of the moving image content is decoded in the AV decoder 41, and the resultant video data and audio data are respectively supplied to the display 45 and the speaker 46 via the renderer 44 (Step S304).

Additionally, in the information processing apparatus 4, the application is extracted from the received data structure (Step S305), installed in the application execution environment 43, and executed (Step S306).

Furthermore, in the information processing apparatus 4, the POI metadata is extracted from the received data structure by the POI metadata processing module 42 (Step S307) and is supplied to the application execution environment 43. The application execution environment 43 generates, on the basis of the POI metadata, an additional image for informing the user U about a service object in the video, and supplies the additional image to the renderer 44. Thus, a synthesized image in which the additional image is superimposed on the video of the program is obtained and displayed on the display 45 (Step S308).

The user U then provides a service request, through voice, for the service object for which the additional image is presented in the video displayed on the display 45, to the voice AI assistant service terminal 3, and uses the voice AI assistant service (Step S309).

(Regarding Additional Image)

Next, the additional image generated on the basis of the POI metadata will be described.

Figures 5, 6:
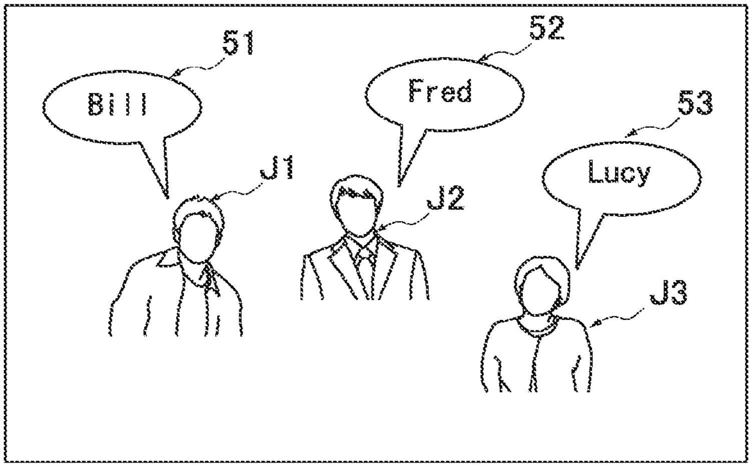
FIG. 5 is a diagram showing an example of a video on which an additional image is superimposed.
FIG. 6 is a block diagram showing a configuration of POI metadata.

FIG. 5 is a diagram showing an example of a video on which the additional image is superimposed.

As shown in the figure, the additional image may be presented as, for example, speech balloons 51, 52, and 53 respectively attached to service objects J1, J2, and J3 for the voice AI assistant service in the video. Visual features unique to the respective service objects J1, J2, and J3 are provided to the speech balloons 51, 52, and 53 such that, in a case where the user U notifies the voice AI assistant service terminal 3 of the service objects J1, J2, and J3 through voice, the service objects J1, J2, and J3 are uniquely determined by voice recognition in the voice AI assistant service terminal 3. This allows the user U to provide a service request for that service object to the voice AI assistant service terminal 3 by using voice expressing the feature of an optional service object.

For example, in the example of FIG. 5, “Bill”, “Fred”, and “Lucy”, which are character strings of the names of people serving as the service objects J1, J2, and J3, are displayed as visual features in the speech balloons 51, 52, and 53. Thus, the user U can use the name of an optional service object, for example, “What is the latest news of Fred?” or “How old is Bill?”, to provide a service request for the service object to the voice AI assistant service terminal 3 through voice. Meanwhile, the voice AI assistant service terminal 3 can identify the service object from the name recognized by the voice recognition module 32 and can execute the voice AI assistant service for the identified service object in accordance with the voice AI assistant service program of the voice AI assistant service program execution environment 35.

Note that the visual features unique to the respective service objects disposed in the speech balloons 51, 52, and 53 may be variously modified with icons, the colors of the speech balloons, the design of the speech balloon, and the like in addition to the character strings of the names of the people appearing in the video.

As described above, in this embodiment, the additional image for informing the user U about the service object is generated for a service object for a voice AI assistant service in the video of the moving image content, and then superimposed on the video of the moving image content to be presented, and thus the user U can uniquely determine the service object from the video and perform a service request for an optional service object. Thus, useless operations of the user U to provide a service request for an object other than the service object to the voice AI assistant service terminal 3 are eliminated, and the voice AI assistant service can be optimally used.

Additionally, the visual features unique to the respective service objects are provided to the additional image such that the service object may be uniquely recognized by the voice recognition in the voice AI assistant service terminal 3, and thus the user U can provide a service request for that service object to the voice AI assistant service terminal 3 by using voice while using voice expressing a feature of an optional service object. Thus, the user U does not hesitate about how the service object is expressed to give a notice to the voice AI assistant service, the service object is reliably identified in the voice AI assistant service terminal 3, and thus an optimal voice AI assistant service is achieved.

Next, the structure of the POI metadata will be described.

(Structure of POI Metadata)

FIG. 6 is a block diagram showing a configuration of the POI metadata.

The POI metadata includes a POI icon image, a POI presentation color, a POI presentation position, a POI presentation text, and POI filtering information.

The POI icon image is the substance of an icon file, which is used in a case where an icon is presented on the additional image as a visual feature of the service object unit, or a reference URL (Uniform Resource Locator) to the icon file. An XML (Extensible Markup Language) representation of the POI icon image will be shown below.

<POIIcon iconPng=‘true’> . . . (base64 encoded png file) . . . </POIIcon>

<POIIcon iconPngURL=‘true’>http:// . . . (URL of icon png file) . . . </POIIcon>

The POI presentation color is used in a case where a visual feature using color is provided to the additional image. For information of the POI presentation color, for example, a color code of CSS (Cascading Style Sheets) or the like is used. The XML representation of the POI presentation color will be shown below.

<POIColor> . . . (CSS color code) . . . </POIColor>

The POI presentation position includes information such as a URI (Uniform Resource Identifier) of target content, in which the additional image is presented, a URI of an application that performs processing of presenting the additional image on the basis of the POI metadata, a presentation time of the additional image, and a presentation position of the additional image. The XML representation of the POI presentation position will be shown below.

<POITargetContentID URL=‘http://a.com/programA.MPD’/>

<POIApplication URL=‘http://a.com/POI presentation application for program A.html(URL of POI presentation application)’/>

<POITimePosition start=‘POYOMODT1H15M2.000S (start time)‘end=’POYOMODT1H15M2.500S(end time)’/>

<POISPosition x=‘345(x coordinate pixel)’y=‘567(y coordinate pixel)’/>

The POI presentation text is a character string presented on the additional image in a case where a visual feature using characters is provided to the additional image. The XML representation of the POI presentation text will be shown below.

<POIText> . . . (presentation character strings) . . . </POIText>

The POI filtering information is used in a case where the presentation restriction corresponding to the user or a user attribute of the additional image is performed. The POI filtering information is information for identifying the user U to which the additional image is to be presented, and includes an identification name of a user demographic class and optional user identification information.

The user demographic class means a class, into which the user U is classified on the basis of attributes of the user, such as sex, age, a living region, an occupation, an academic background, and a family structure, and is uniquely identified by the identification name of the user demographic class. The XML representation of the identification name of the user demographic class will be shown below.

<POITargetUser demographicClass='true'> . . . (user demographic class identification name) . . . </POITargetUser>

The optional user identification information is, for example, user identification information such as an account name of a broadcast-station-related service. The XML representation of the optional user identification information will be shown below.

<POITargetUser privateAccount='true'>https:// . . . (URL for identifying user account of service or the like) . . . </POITargetUser>

Note that at least any one of the POI icon image, the POI presentation color, or the POI presentation text only needs to be defined. The POI filtering information is defined in a case where the presentation restriction of additional information to be described later is introduced.

(Regarding Presentation Restriction for Additional Images)

Figure 7:
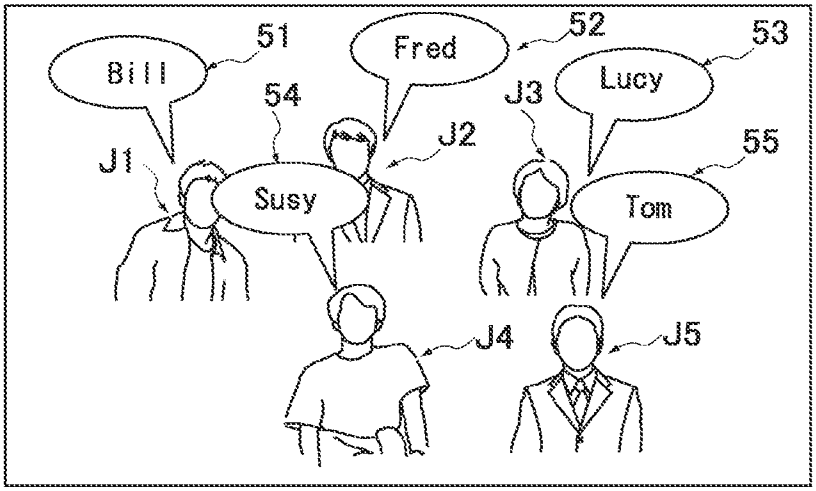
FIG. 7 is a diagram showing another example of a video on which an additional image is superimposed.

In the embodiment described above, the additional image is presented on the service object for the voice AI assistant service, in the video of the moving image content. However, for example, as shown in FIG. 7, in a case where many service objects J1 to J5 are present in one scene, additional images 51 to 55 corresponding to the number of those service objects J1 to J5 are presented. Those additional images 51 to 55 hide part of the video of the program, and visual effects of the video of the program are liable to be deteriorated.

Figure 8:
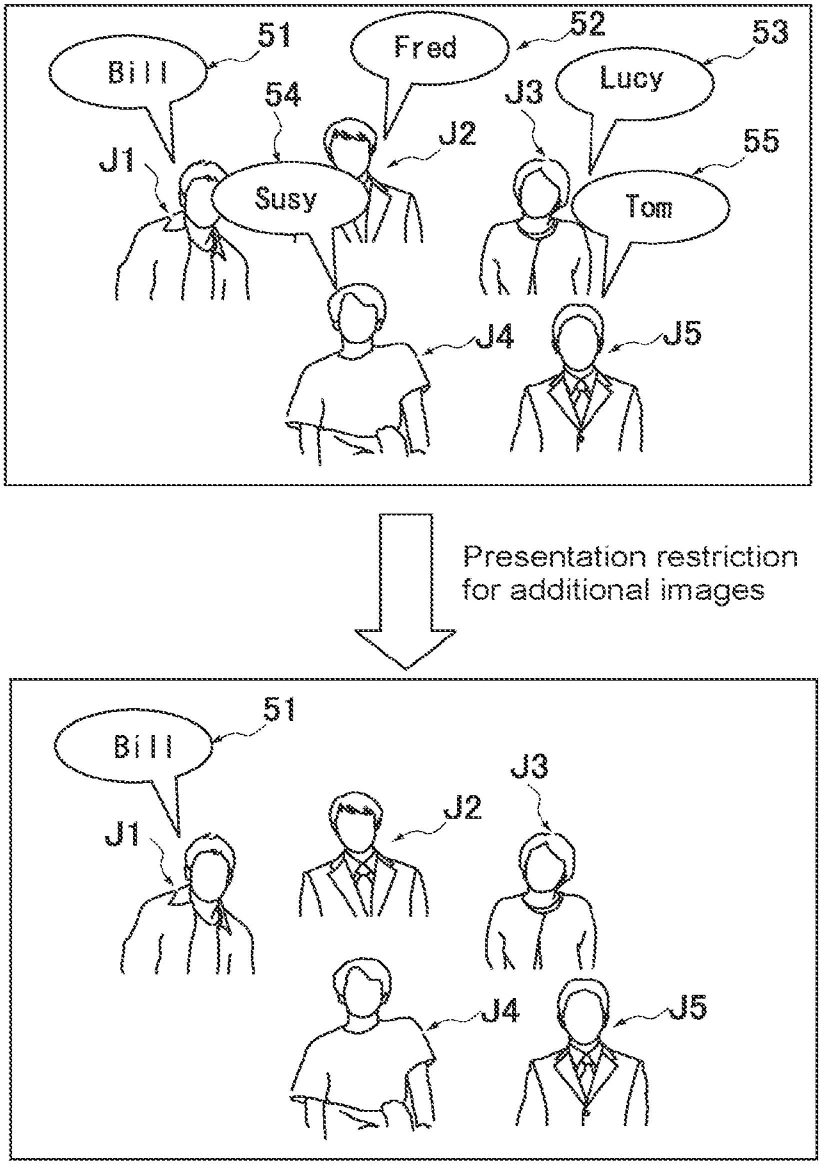
FIG. 8 is a diagram showing presentation restriction for additional images.

In this regard, for example, as shown in FIG. 8, it is effective to restrict the service objects, on which the additional images are presented, according to the user U. For example, the additional image is presented on a service object in which the user U is interested, and no additional images are presented on the other service objects. This can suppress the following situation to a minimum: part of the video of the program is hidden by many additional images and the entire video gets messy by the additional images. This function will be called "presentation restriction for additional images".

Figure 9:
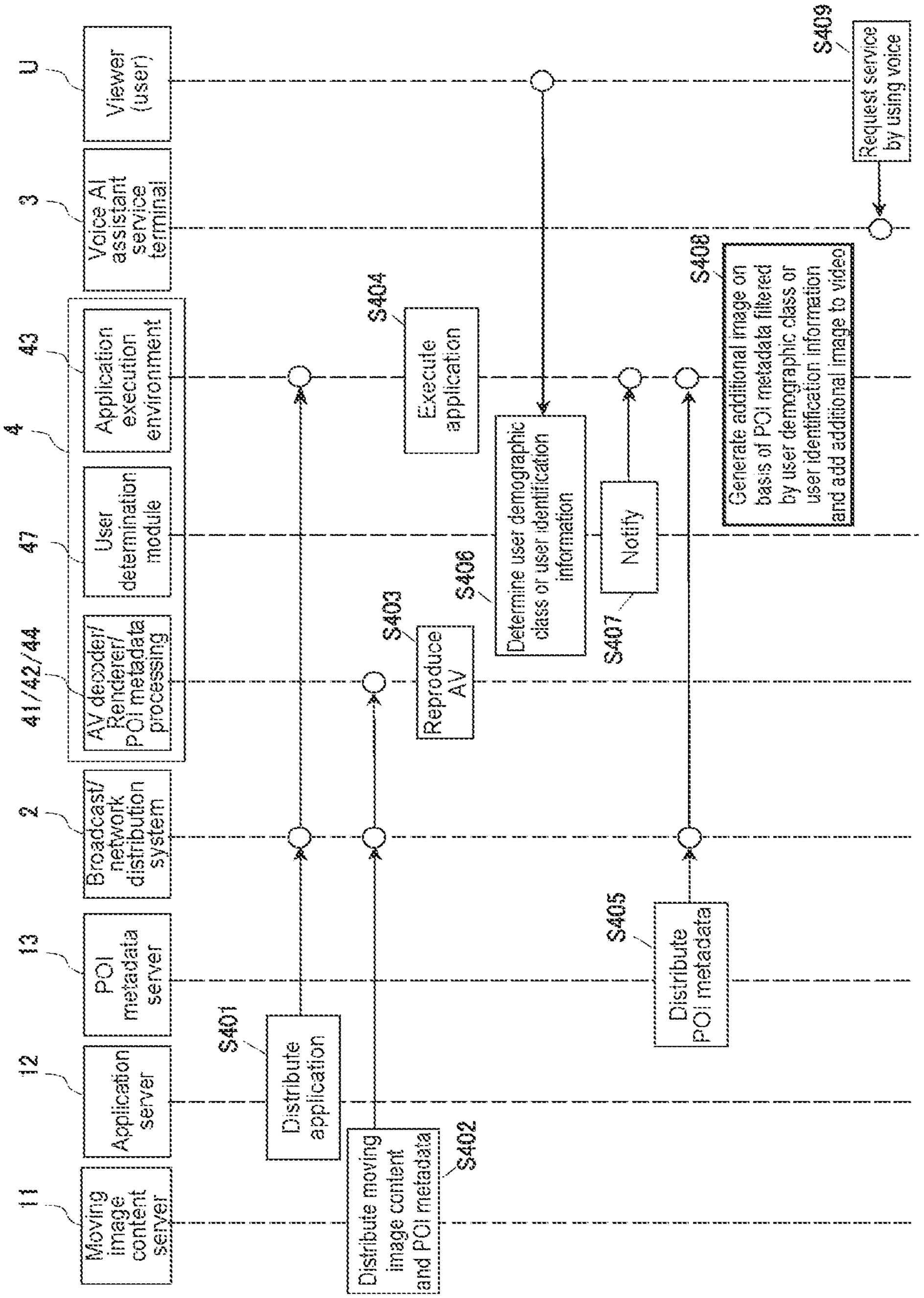
FIG. 9 is a sequence diagram showing an overall operation flow (part 3) including the presentation restriction for additional images in the information processing system 100 of FIG. 1.

FIG. 9 is a sequence diagram showing the operation flow including the presentation restriction for additional images.

Here, the operations of Steps S401 to S405 are the same as those of Steps S101 to S105 in the operation flow (part 1) shown in FIG. 2, and thus description thereof will be omitted.

To perform the presentation restriction for additional images, the user determination module 47 of the information processing apparatus 4 determines a user demographic class or user identification information of the user U (Step S406). The application execution environment 43 is notified of the determined user demographic class or user identification information of the user U (Step S407).

The user demographic class is a class, into which a user is classified on the basis of various attributes of the user, such as sex, age, a living region, an occupation, an academic background, and a family structure. For example, if it can be statistically said that men in their twenties highly tend to be interested in a new actress who has been popular recently, the user demographic class of the men in their twenties is matched with a user demographic class defined in the POI metadata for a person (service object) played by the new actress in the program.

The method of determining the user demographic class or user identification information of the user U by the user determination module 47 includes the following.

1. The user determination module 47 estimates attributes of the user U, such as sex and an age group, from an analysis result of a face image of the user U captured by a camera and determines a user demographic class from the estimated attributes.
2. The user determination module 47 estimates attributes of the user U on the basis of information, which is obtained through a question given from the voice AI assistant service terminal 3 to the user U through sound, and determines a user demographic class.
3. In a case where a plurality of users who uses the information processing apparatus 4 is restricted, the identification name of a user demographic class or the user identification information is registered in advance in association with the user name of each user, and thus the user determination module 47 can determine the identification name of a user demographic class or the user identification information corresponding to the user name, which is confirmed through authentications such as a biometric authentication and a card authentication.

Next, the application execution environment 43 of the information processing apparatus 4 extracts POI metadata in which the identification name of the user demographic class or the user identification information, which is determined by the user determination module 47, is defined as the POI filtering information, from all of the POI metadata of respective scenes of the video of the moving image content, generates an additional image, which informs the user U about a service object in the video, on the basis of the extracted POI metadata, and supplies the additional image to the renderer 44. Thus, a synthesized image in which the additional image is superimposed on the video of the program is obtained and displayed on the display 45 (Step S408).

The user U then provides a service request, through voice, for the service object for which the additional image is presented in the video displayed on the display 45, to the voice AI assistant service terminal 3, and uses the voice AI assistant service (Step S409).

Note that the presentation restriction for additional images has been described here assuming the overall operation flow (part 1) of the information processing system shown in FIG. 2, but the same holds true for the overall operation flow (part 2) and the overall operation flow (part 3).

Next, referring back to FIG. 8, description will be continued. Here, it is assumed that the identification name of the user demographic class of the service object J1 in the video is "class 1", the identification names of the user demographic classes of the other service objects J2 to J5 are other than "class 1". Meanwhile, it is assumed that the user determination module 47 determines the user demographic class of the user U as "class 1". In this case, the additional image 51 is presented for the service object J1 only, and thus it is possible to suppress the following situation to a minimum: part of the video of the program is hidden by the additional images 52 to 55 added to the service objects J2 to J5, in which the user U is not interested, and the entire video gets messy.

Note that in a case where the presentation restriction for additional images is performed with the user identification information as a filtering condition, an additional image for a specific service object can be presented to a specific user U only.

(Setting of User Demographic Class Based on Viewing History of User U)

Note that, in the above description, the user demographic class of the user U is determined from attributes such as sex, age, a living region, an occupation, an academic background, and family attributes, but the user determination module 47 may calculate a preference condition of the user U on the basis of the viewing history of the user U and determine the user demographic class on the basis of the preference condition or considering the preference condition.

(Trick Play Reproduction Based on POI Metadata)

Next, a trick play reproduction based on the POI metadata will be described.

The trick play reproduction based on the POI metadata is to reproduce at a first double-speed a scene in which the additional image is presented on the basis of the POI metadata extracted on the basis of the user demographic class or user identification information of the user U, and to reproduce the other scenes at a second double-speed faster than the first double-speed.

Here, the first double-speed is, for example, a 1× speed (equal speed) or a speed slower than the 1× speed. The second double-speed is, for example, for a fast-forward reproduction faster than the 1× speed.

Next, the operation of the trick play reproduction based on the POI metadata will be more specifically described.

First, the user determination module 47 determines the user demographic class or user identification information of the user U and supplies it to the application execution environment 43.

The application execution environment 43 selects, from all the POI metadata of the respective scenes of the video of the program, POI metadata in which the identification name of the user demographic class or the user identification information, which is determined by the user determination module 47, is defined as the POI filtering information, and the application execution environment 43 performs the trick play reproduction on the basis of the extracted POI metadata.

Figure 10:
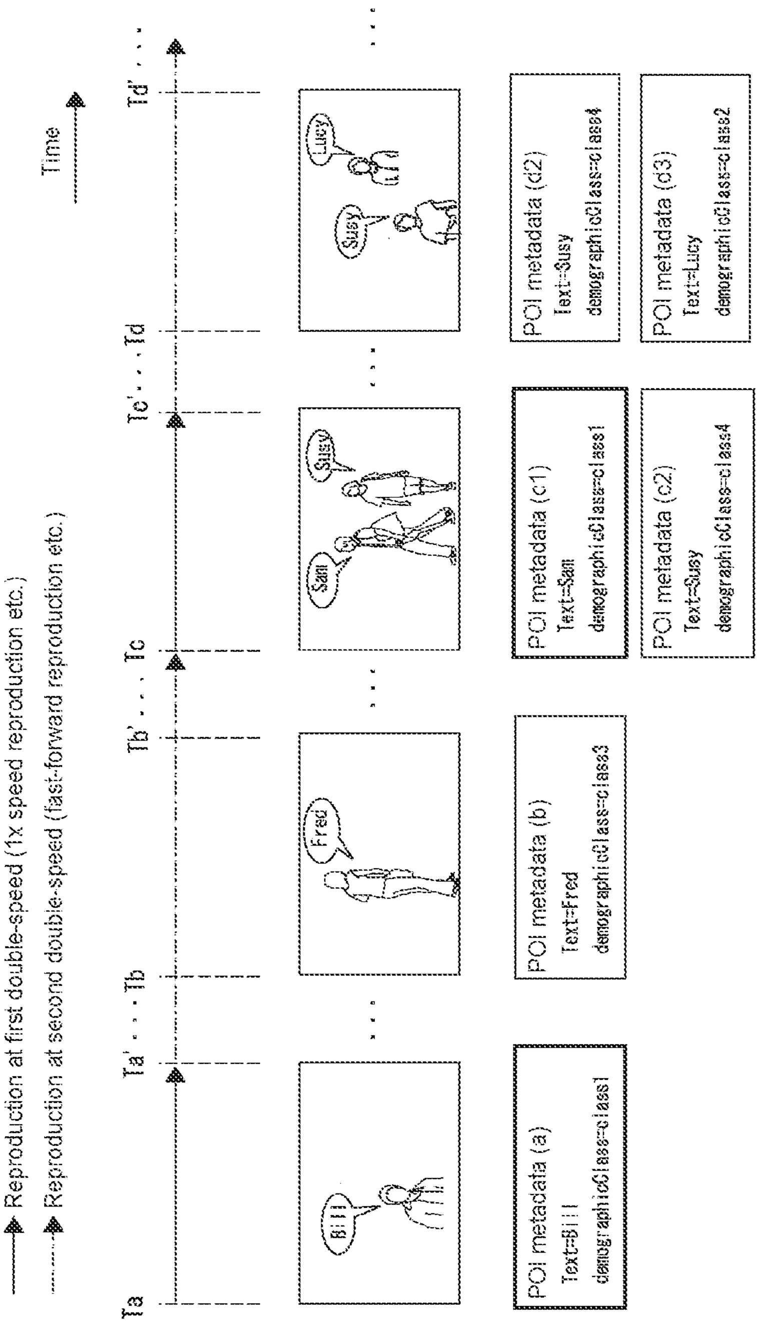
FIG. 10 is a diagram for describing trick play reproduction based on the POI metadata.

FIG. 10 is a diagram specifically showing the trick play reproduction based on the POI metadata.

Here, it is assumed that the user demographic class of "Bill" and "Sam" that are service objects is "class 1", and the user demographic class of the user U, which is determined by the user determination module 47, is "class 1".

"Bill" having the user demographic class of "class 1" appears in the video during a Ta-Ta' period, and thus the application execution environment 43 reproduces the video including an additional image at the first double-speed during the Ta-Ta' period. Subsequently, no service objects having the user demographic class of "class 1" appear in the video until time Tc, and thus the application execution environment 43 performs reproduction at the second double-speed faster than the first double-speed. Note that the additional image is not presented in the reproduction at the second double-speed, and thus the load on the application execution environment 43 can be reduced. "Sam" having the user demographic class of "class 1" appears in the video during a Tc-Tc' period, and thus the application execution environment 43 reproduces the video including an additional image at the first double-speed during the Tc-Tc' period. No service objects having the user demographic class of "class 1" appear in the video after the time Tc', and thus the reproduction at the second double-speed is performed.

In such a manner, a scene in which the additional image is presented on the basis of the POI metadata extracted on the basis of the user demographic class or user identification information of the user U is reproduced at the first double-speed, and the other scenes are reproduced at the second double-speed faster than the first double-speed, thus achieving the trick play reproduction focusing on the scene that is useful (interesting) for the user U.

Additionally, a skip reproduction may be performed on only the scene in which the additional image is presented on the basis of the POI metadata extracted on the basis of the user demographic class or user identification information of the user U.

The functions of the presentation of additional images, the presentation restriction for additional images, the trick play reproduction, and the like on the basis of the POI metadata by the information processing system according to this embodiment have been described so far.

(Regarding Application Execution Environment 43)

Figure 11:
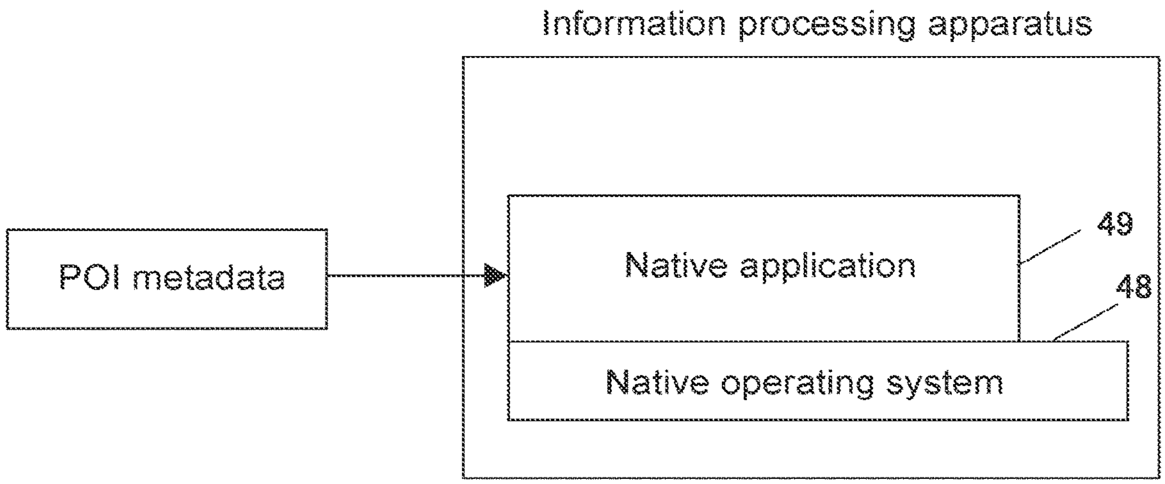
FIG. 11 is a diagram showing an example of an application execution environment 43 in which the POI metadata is processed.

FIG. 11 is a diagram showing an example of the application execution environment 43 in which the POI metadata is processed.

This example shows a case where an application that processes the POI metadata is a native application 49 that operates on a native operating system 48 of the information processing apparatus 4.

Figure 12:
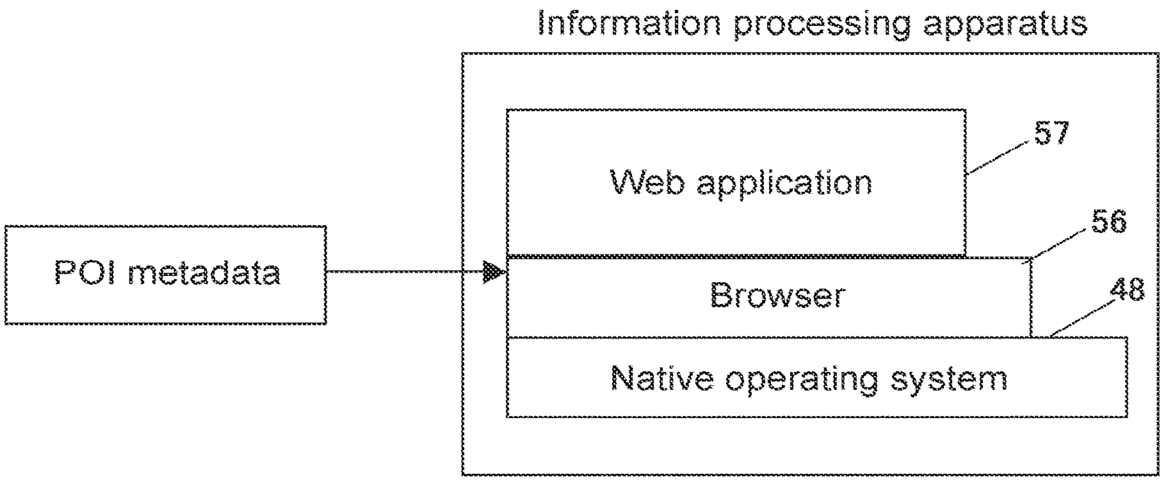
FIG. 12 is a diagram showing another example of the application execution environment 43 in which the POI metadata is processed.

FIG. 12 is a diagram showing another example of the application execution environment 43 in which the POI metadata is processed.

This example shows a case where an application that processes the POI metadata is a web application 57 that operations on a web browser 56. In this case, the POI metadata and the web application 57 are simultaneously or substantially simultaneously distributed to the information processing apparatus 4.

(POI Metadata Transfer Method)

Figure 13:
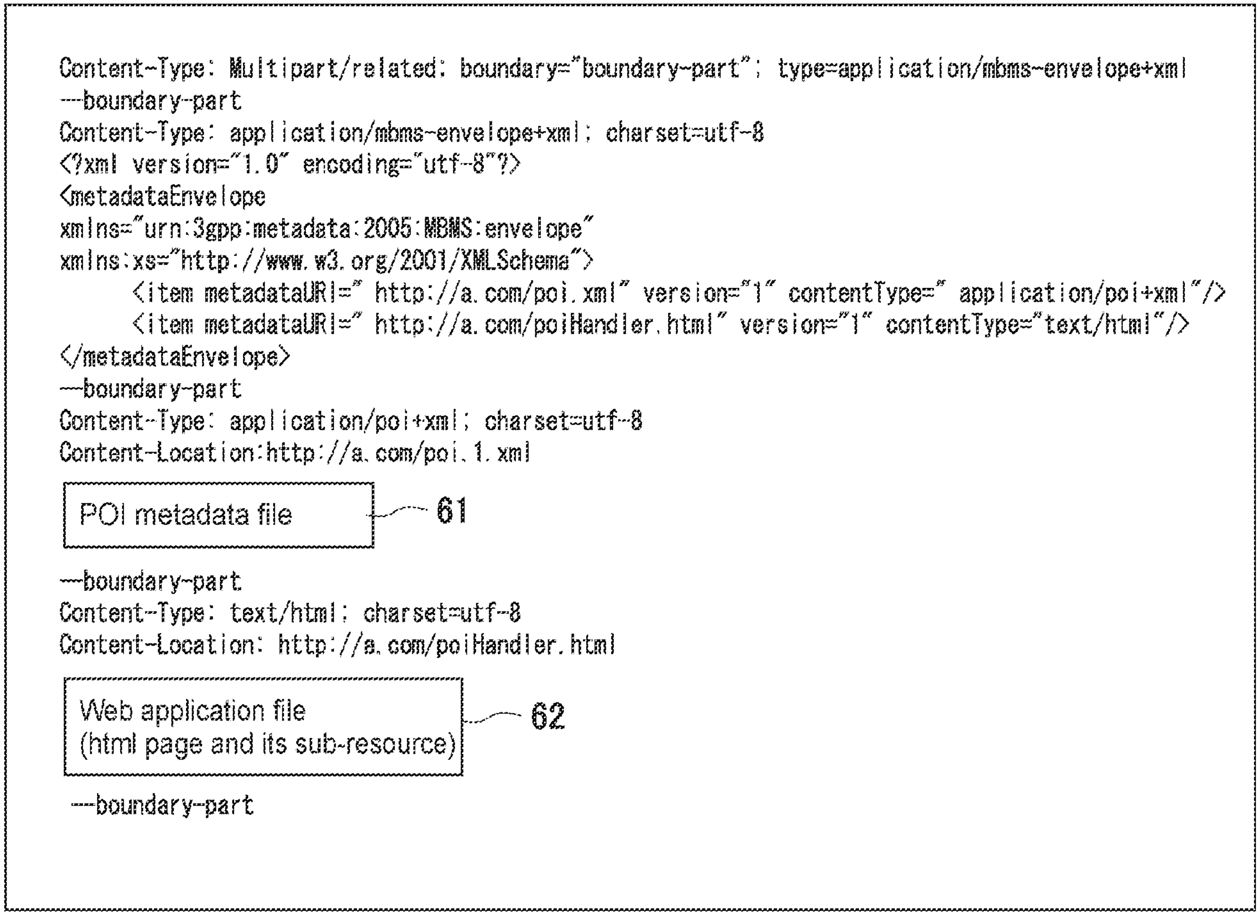
FIG. 13 is a diagram showing an example of a Multi-part MIME format packaging a web application and the POI metadata.

To simultaneously distribute the web application and the POI metadata to the information processing apparatus 4, a method of packaging the web application and the POI metadata by using a Multi-part MIME (Multipurpose Internet MAIl Extensions) format is employed. FIG. 13 is a diagram showing an example of the Multi-part MIME format packaging the web application and the POI metadata. In the Multi-part MIME format, a POI metadata file 61 and a web application file 62 are individually stored in respective parts separated by boundary-parts.

Note that, in a case where an application that processes the POI metadata is a native application that operates with the operation system being as an application execution environment, or the application is distributed separately from the POI metadata, only the POI metadata file may be stored in the Multi-part MIME format and then distributed.

Next, a method of storing a track of the POI metadata in an MP4 file format and transferring the MP4 file format, in a similar manner to the track of media data such as video data and audio data, will be described.

Figure 14:
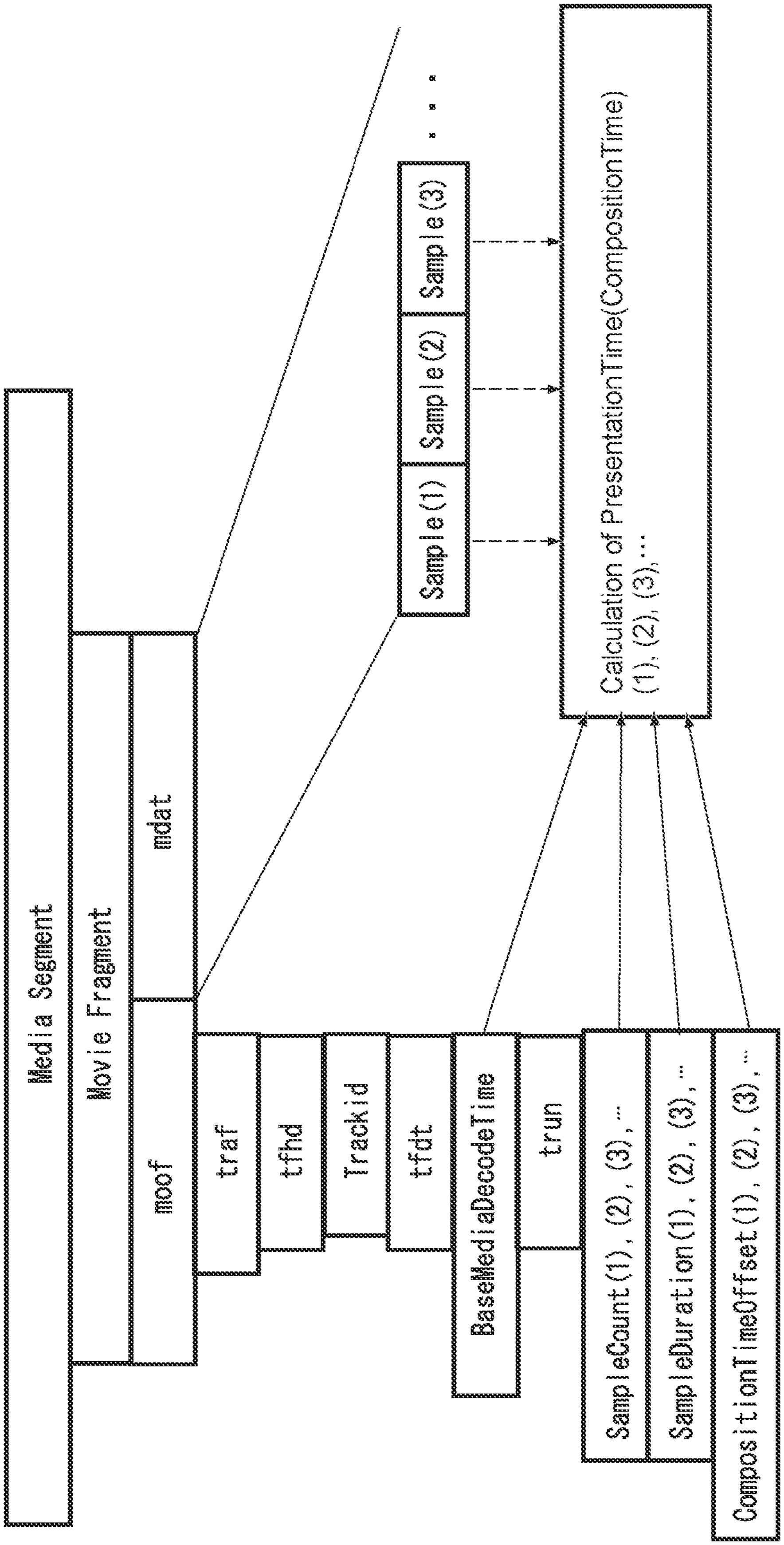
FIG. 14 is a diagram showing a configuration of Media Segment in an MP4 file format.

FIG. 14 is a diagram showing a configuration of a Media Segment in the MP4 file format.

As shown in the figure, the Media Segment includes a plurality of Movie Fragents, and each Movie Fragent is configured by an moof box and an mdat box. In the mdat box, for example, media data is divided into a plurality of Sample boxes by a time unit such as a frame and stored to be randomly accessible. In the moof box, metadata regarding presentation, such as information for generating a timing to present the media data of each Sample box of the mdat box, is stored.

In this embodiment, a Media Segment in which video data is stored in each Sample box of the mdat box, a Media Segment in which audio data is stored in each Sample box of the mdat box, a Media Segment in which the POI metadata is stored in each Sample box of the mdat box are prepared.

Note that, in this embodiment, the MP4 file is assumed as a Media Segment of an MPEG-DASH (Dynamic Adaptive Streaming over HTTP).

(Regarding MPEG-DASH)

In the MPEG-DASH, a plurality of data groups having different coding rates and screen sizes is prepared for one piece of moving image content so as to prevent the streaming reproduction from being interrupted. The plurality of data groups is dynamically selected in consideration of the screen size of the information processing apparatus 4, a state of a network bandwidth, or the like. Thus, in the MPEG-DASH, as described above, what coding rates and screen sizes of the data groups are prepared for one piece of moving image content is described in metadata referred to as MPD (Media Presentation Description).

Next, the data structure of the MPD will be described in detail.

The MPD is information regarding the configuration of the moving image content stored in a server, which is described in the hierarchical structure of the XML (extensible markup language) format. The information processing apparatus 4 acquires an MPD file corresponding to target moving image content from an MPD file server and analyzes the MPD file, and thus acquires a Media Segment necessary for presenting the target moving image content from the server.

Figure 15:
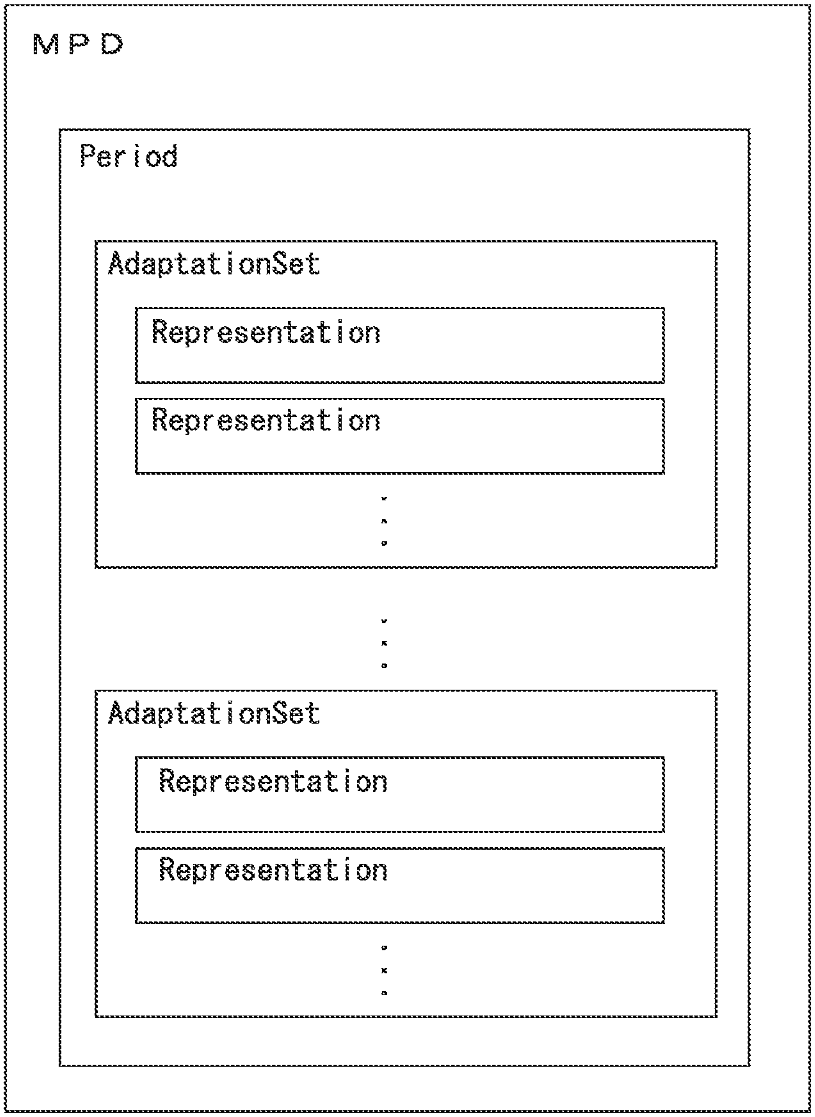
FIG. 15 is a diagram showing a data structure of MPD of MPEG-DASH.

FIG. 15 is a diagram showing a data structure of the MPD.

The MPD includes one Period below the MPD, AdaptationSet for each of the media types below the Period, and a plurality of Representation further below the AdaptationSet.

The hierarchy, i.e., the top hierarchy of the MPD includes information such as a starting point of the MPD, a title, a streaming type (on-demand/live distribution), and the length, as management information regarding one piece of moving image content.

The Period is a unit obtained by dividing one piece of moving image content by a time such as a frame. A start time and an end time are defined for the Period. The Period is configured by a plurality of AdaptationSet.

The AdaptationSet includes codec information regarding data for each of the media types (video, audio, subtitles, POI metadata) of the moving image content of each Period, information such as a language, and the like. The AdaptationSet includes, below the AdaptationSet, Representation for each of the pieces of data having different coding rates and image sizes.

The Representation includes information accumulated in a web server, such as coding rates, image sizes, places (URL), and the like of the segments having different coding rates, image sizes, and the like.

Figure 16:
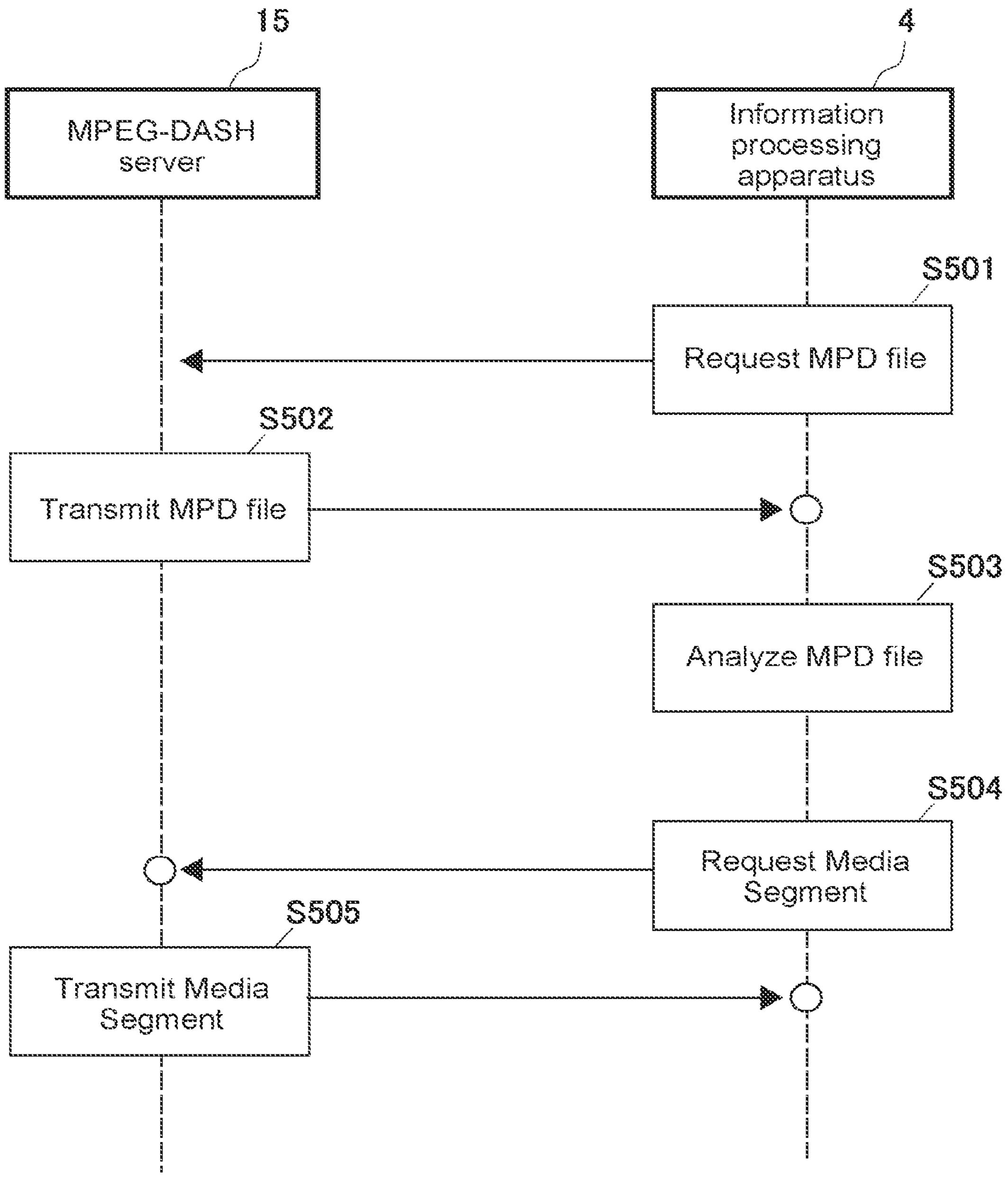
FIG. 16 is a diagram showing interaction between an MPEG-DASH server 15 and the information processing apparatus 4 via a network communication.

FIG. 16 is a diagram showing interaction between an MPEG-DASH server 15 and the information processing apparatus 4 via a network communication.

The MPD file and Media Segments of various types of media of the moving image content are stored in the MPEG-DASH server 15.

The CPU of the information processing apparatus 4 requests the MPEG-DASH server 15 to transmit an MPD file (Step S501). The MPEG-DASH server 15 transmits the MPD file to the information processing apparatus 4 in response to the request (Step S502). The CPU of the information processing apparatus 4 analyzes the received MPD file and confirms what coding rates and image sizes of Media Segments are prepared (Step S503). The CPU of the information processing apparatus 4 requests the MPEG-DASH server 15 to transmit a Media Segment having an optimum image size and coding rate in consideration of the analysis result of the MPD file, the screen size of the display, a state of a network traffic of a transmission path, and the like (Step S504). The MPEG-DASH server 15 transmits the Media Segment to the information processing apparatus 4 in response to the request (Step S505).

Next, to describe a relationship between the MPD and the Media Segment, the data structures of the moof box and the mdat box in the Media Segment will be described referring back to FIG. 14.

As described above, the Media Segment includes a plurality of Movie Fragents, and each Movie Fragent is configured by the moof box and the mdat box. In the mdat box, for example, the media data is divided into a plurality of Sample boxes by a time unit such as a frame and stored to be randomly accessible. In the moof box, metadata regarding presentation, such as information for generating a timing to present the media data of each Sample box of the mdat box, is stored.

As information for generating presentation start times PresentationTime (1), (2), (3), . . . , of the media data of respective Samples (1), (2), (3), . . . , BaseMediaDecodeTime is stored in a predetermined lower-level box (moof/traf box) of the moof box, and SampleCount (1), (2), (3), . . . , SampleDuration (1), (2), (3), . . . , and CompositionTimeOffset (1), (2), (3), . . . are further stored in another box (trun box) as information associated with the respective Sample (1), (2), (3), . . . . The BaseMediaDecodeTime is information of a relative time from the starting point of the Period to the starting point of the Movie Fragment. The SampleCount (1), (2), (3), . . . is the number of Samples, the SampleDuration (1), (2), (3), . . . is the length of Sample (1), (2), (3), . . . , and the CompositionTimeOffset (1), (2), (3), . . . is an adjustment time.

Next, the method of calculating the presentation start time PresentationTime of the Sample will be described.

Assuming that the presentation start time of the N-th Sample is PresentationTime(N), the PresentationTime(N) is calculated by BaseMediaDecodeTime+(sum of Sample(1), . . . , to the (N−1)th Sample(1), (N−1) SampleDuration(1), . . . , and (N−1))+(CompositionTimeOffset of N-th Sample) (N).

(Typical Presentation Control for MPEG-DASH Moving Image Content)

Figure 17:
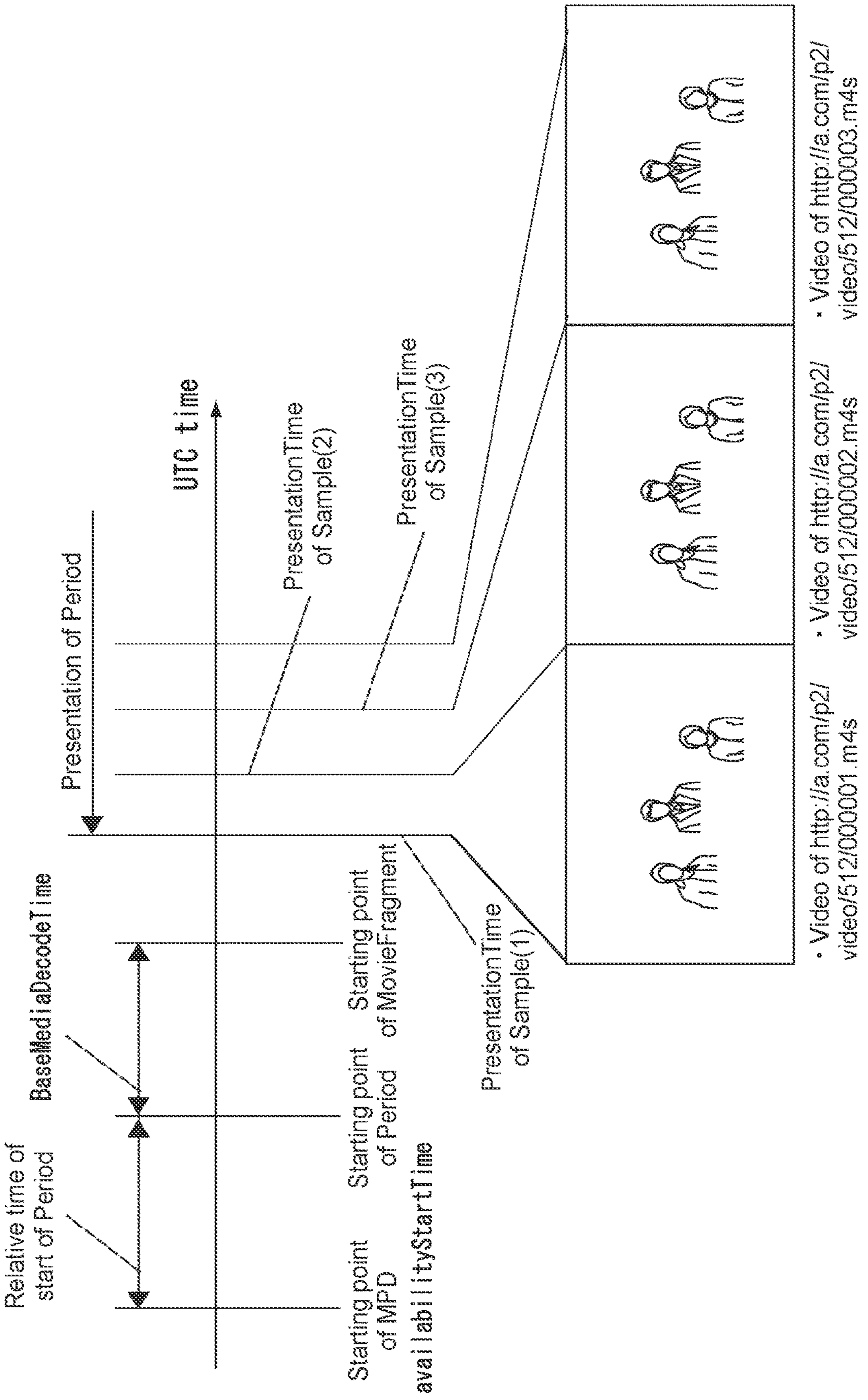
FIG. 17 is a diagram showing the flow of presentation control for MPEG-DASH moving image content.

FIG. 17 is a diagram showing the flow of the presentation control for the MPEG-DASH moving image content.

In the figure, the horizontal axis is assumed as the axis of real time (UTC time). The CPU of the information processing apparatus 4 generates a starting point of the first Period on the real time on the basis of a start time defined for Period as a relative time to the starting point of the MPD, with reference to the starting point of the MPD defined in the MPD file.

Subsequently, the CPU of the information processing apparatus 4 generates a starting point of Movie Fragment on the real time on the basis of BaseMediaDecodeTime, and further generates a presentation start time (PresentationTime (1)) of a first Sample (1) of the Period by using SampleCount, SampleDuration, and CompositionTimeOffset and starts presentation of the first Sample (1) from that time. Subsequently, the CPU of the information processing apparatus 4 similarly generates a presentation start time (PresentationTime(2)) of the next Sample (2) and switches a target to be presented at that time from the Sample (1) to the Sample (2). Hereinafter, the switching of presentation between Samples is similarly performed. In such a manner, the video of each Sample (1), (2), . . . is presented without being temporally interrupted.

In this embodiment, AdaptationSet corresponding to the POI metadata is added to the MPD file, and thus the presentation control for additional images can be performed by following the presentation control method for the MPEG-DASH moving image content as it is. This allows an additional image to be presented in synchronization with each medium such as video or audio of the MPEG-DASH moving image content.

Figure 18:
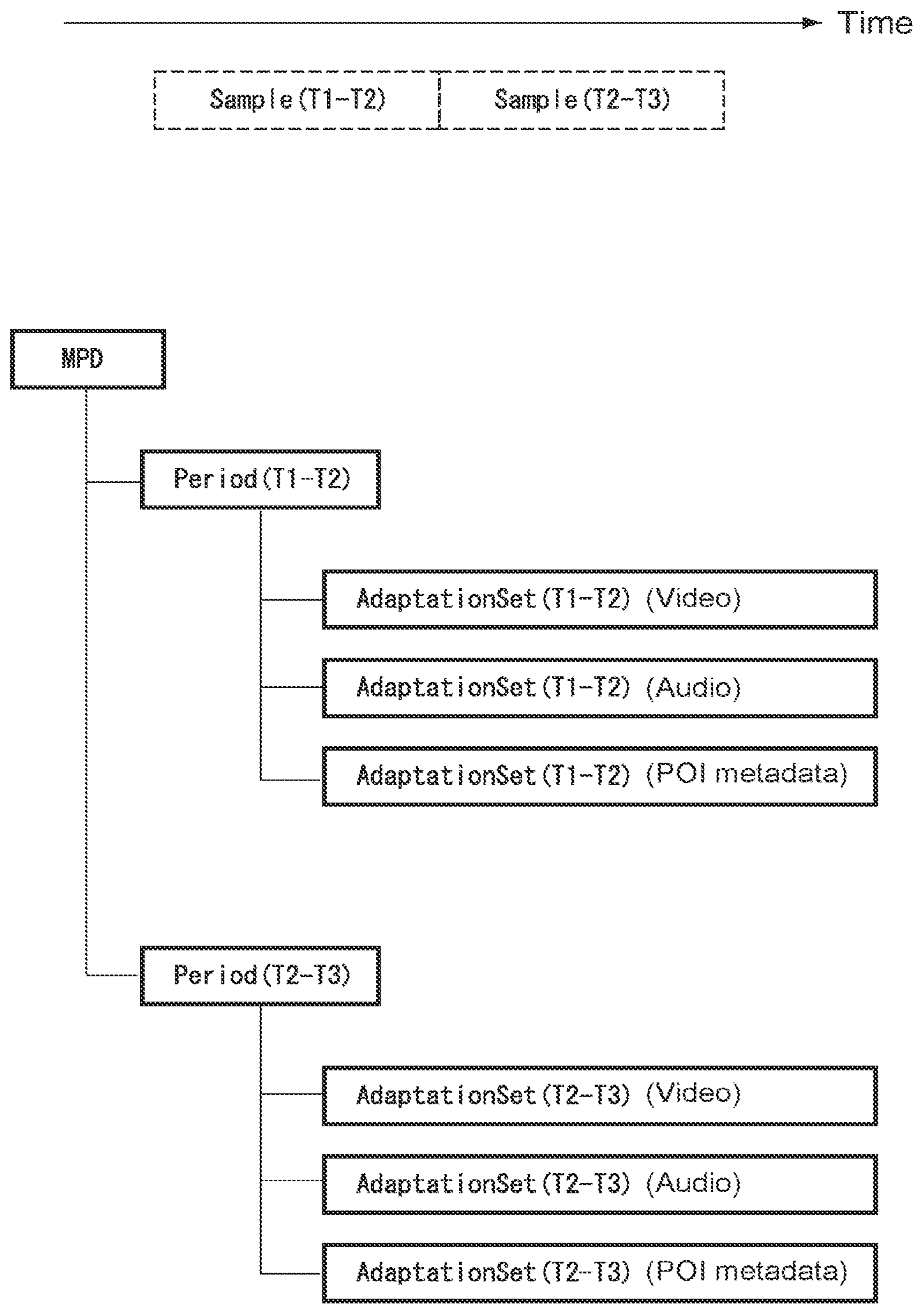
FIG. 18 is a diagram showing a configuration of the MPD to which AdaptationSet of the POI metadata is added.

For example, as shown in FIG. 18, in a case where the additional image is presented in synchronization with a video in Period (T1-T2) from T1 to T2 on the real time, AdaptationSet (T1-T2) of the POI metadata is added to the lower-level hierarchy of the Period (T1-T2) of the MPD. Furthermore, in a case where the additional image is presented in synchronization with a video in Period (T2-T3) from T2 to T3 on the real time, AdaptationSet (T2-T3) of the POI metadata is added to the lower-level hierarchy of the Period (T2-T3) of the MPD.

Figure 19:
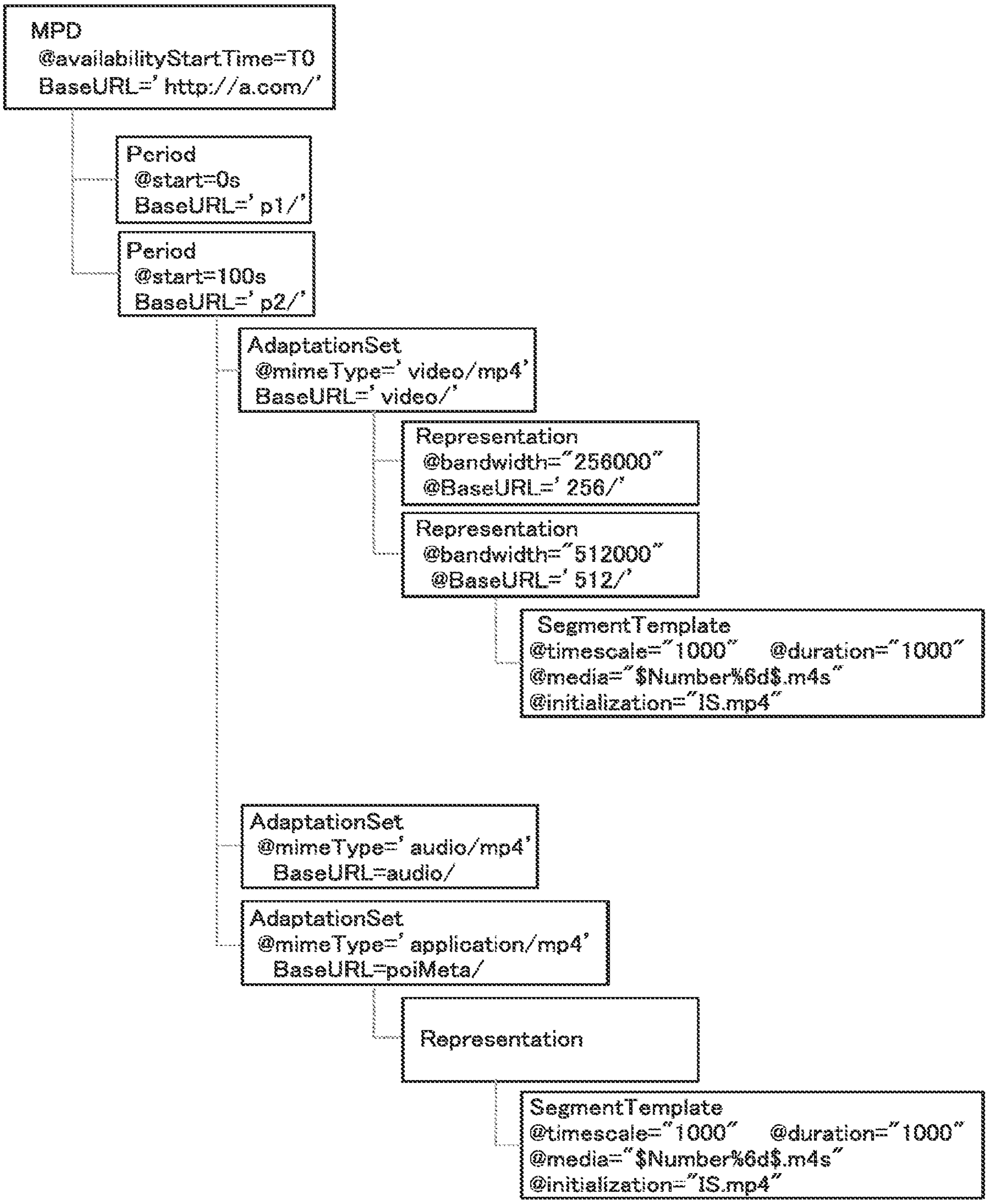
FIG. 19 is a diagram showing a more specific example of the MPD to which AdaptationSet of the POI metadata is added.

FIG. 19 is a diagram showing a more specific example of an MPD to which AdaptationSet of the POI metadata is added.

In the top hierarchy of the MPD, @avAIlabilityStartTime=T0 is described. This indicates that the starting point of the moving image content time is TO. In the lower-level hierarchy thereof, two Periods are stored. Of the two Periods, the first Period is defined to be started at 0 sec after the starting point of T0, and the second Period is defined to be started at 100 sec after the starting point of T0.

In this example, AdaptationSets of the video, the audio, and the POI metadata are present as AdaptationSet of the second Period. In the lower-level hierarchy of AdaptationSet of the video, two Representations indicating different coding rates (256 Kbps/512 Kbps) are present. In the lower-level hierarchy of each Representation, SegmentTemplate is present, in which a method of generating a URL indicating a place for Media Segment of the video, an acquisition cycle, and the like are described.

Here, "@timescale="1000"" and "@duration="1000"" mean that, if the value of 1000 minutes in the time scale of 1/1000 seconds, i.e., one second is set as a segment time length, the video can be acquired in the cycle of this segment time length. "@Media="$Number %6d$.m4s"" indicates the method of generating the lowermost value of the URL showing the place for the video of each Sample, and specifically means an integer of a value having six digits, which increases from 1. For example, the URL of the Sample is generated by connecting the value, which is shown by "BaseURL" described in each element of the MPD, to the path format and adding the value having six digits, which is generated by "@Media="$Number %6d$.m4s"", to the end of the URL. In other words, the URL of the first Sample of the video is created as "HTTP://a.com/p2/video/512/000001.m4s".

"@initialization="IS.mp4"" is a value used for the URL of Initialization Segment of the first Media Segment of the video. The URL of Initialization Segment is also generated by connecting the value, which is shown by "BaseURL" described in each element of the MPD, to the path format and adding "IS.mp4" to the end of the URL. For example, the URL of Initialization Segment is created as "HTTP://a.com/p2/video/512/IS.mp4".

In the lower-level hierarchy of AdaptationSet of the POI metadata, Representation is present, and in the further lower-level hierarchy thereof, SegmentTemplate is present, in which a method of generating a URL indicating a place for Media Segment of the POI metadata, an acquisition cycle, and the like are described. The method of generating a URL indicating a place for Media Segment of the POI metadata may be the same as the method of generating the URL indicating the place for Media Segment of the video. Additionally, a method of generating a URL indicating a place for Initialization Segment of the POI metadata may also be the same as the method of generating the URL indicating the place for Initialization Segment of the video. Initialization Segment of the POI metadata includes information for identifying the POI metadata stored as Sample in the Media Segment. Specifically, if the value of a handler_type field of moov(MovieBox)/trak(TrackBox)/mdia(MediaBox)/hdlr(HandlerBox) of Initialization Segment is "meta", it is possible to identify the POI metadata stored as Sample in the Media Segment.

The CPU of the information processing apparatus 4 can acquire each of the video, the audio, and the POI metadata of the moving image content in the unit of Sample on the basis of the URL generated as described above.

Figure 20:
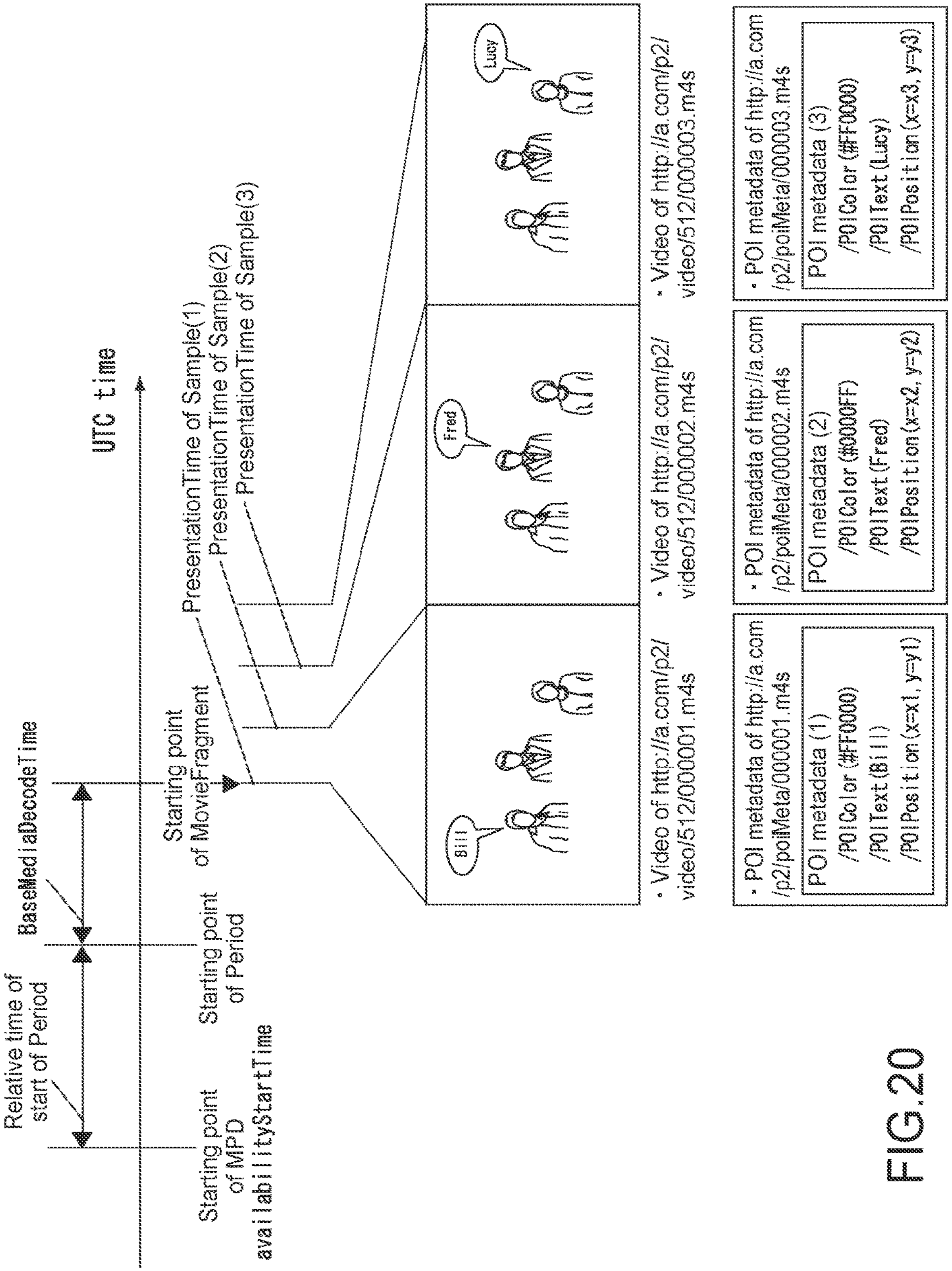
FIG. 20 is a diagram showing the flow of presentation for a video and additional images on the basis of the MPD.

FIG. 20 is a diagram showing the flow of the presentation for a video based on the MPD and an additional image.

The processing of presenting each of Samples (1), (2), and (3) of the video is as described above.

Here, the CPU of the information processing apparatus 4 performs presentation processing for additional images on the basis of POI metadata (1) from a presentation start time (PresentationTime) (1) on the real time of the first Sample (1) of the video to a presentation start time (PresentationTime) (2) on the real time of the next Sample (2). Subsequently, the CPU of the information processing apparatus 4 performs presentation processing for additional images on the basis of POI metadata (2) from the presentation start time (PresentationTime) (2) on the real time of the Sample (2) to a presentation start time (PresentationTime) (3) on the real time of the next Sample (3). Furthermore, the CPU of the information processing apparatus 4 performs presentation processing for additional images on the basis of POI metadata (3) from the presentation start time (PresentationTime) (3) on the real time of the Sample (2) to a presentation start time (PresentationTime) (4) on the real time of the next Sample (3).

As described above, in this embodiment, the AdaptationSet for the POI metadata is added to the MPD file, and thus the presentation control for additional images on the basis of the POI metadata can be performed using the same mechanism as the presentation control for other types of media such as video and audio, and the additional images can also be presented correctly in synchronization with other types of media such as video and audio.

(Movement of Presentation Position of Additional Image)

Figure 21:
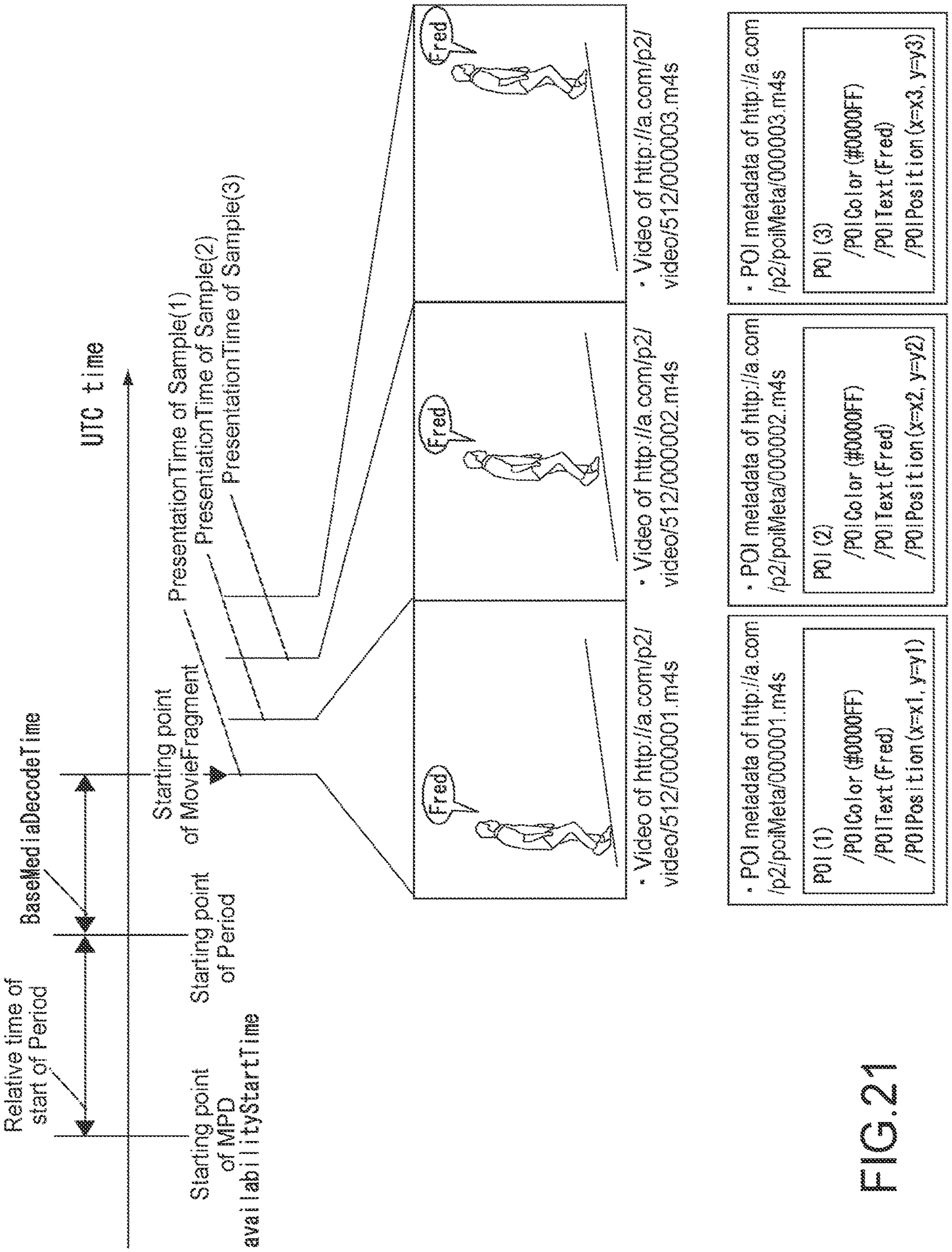
FIG. 21 is a diagram showing the POI metadata in a case where a presentation position of the additional image is moved along the movement of a service object.

FIG. 21 is a diagram showing the POI metadata in a case where a service object in the video moves with time, and a presentation position of an additional image is also moved along with the movement of the service object.

Here, T1 is a presentation start time of an additional image based on the POI metadata (1), T2 is a presentation start time of an additional image based on the POI metadata (2), and T3 is a presentation start time of an additional image based on the POI metadata (3). T1-T2 is a presentation period for the additional image based on the POI metadata (1), and during this period, the additional image is presented at a position indicated by a value of POIPosition element, (x=x1, y=y1), in the POI metadata (1). T2-T3 is a presentation period for the additional image based on the POI metadata (2), and during this period, the additional image is presented at a position indicated by a value of POIPosition element, (x=x2,y=y2), in the POI metadata (2). T3-T4 is a presentation period for the additional image based on the POI metadata (3), and during this period, the additional image is presented at a position indicated by a value of POIPosition element, (x=x3,y=y3), in the POI metadata (3).

In such a manner, the value of the POIPosition element in the POI metadata of each Sample is determined in accordance with the position of the moving service object, and thus the presentation position of the additional image can be moved correctly in synchronization with the movement of the service object.

(Presentation Updating Control Over Plurality of Sample Times of POI Metadata)

Figure 22:
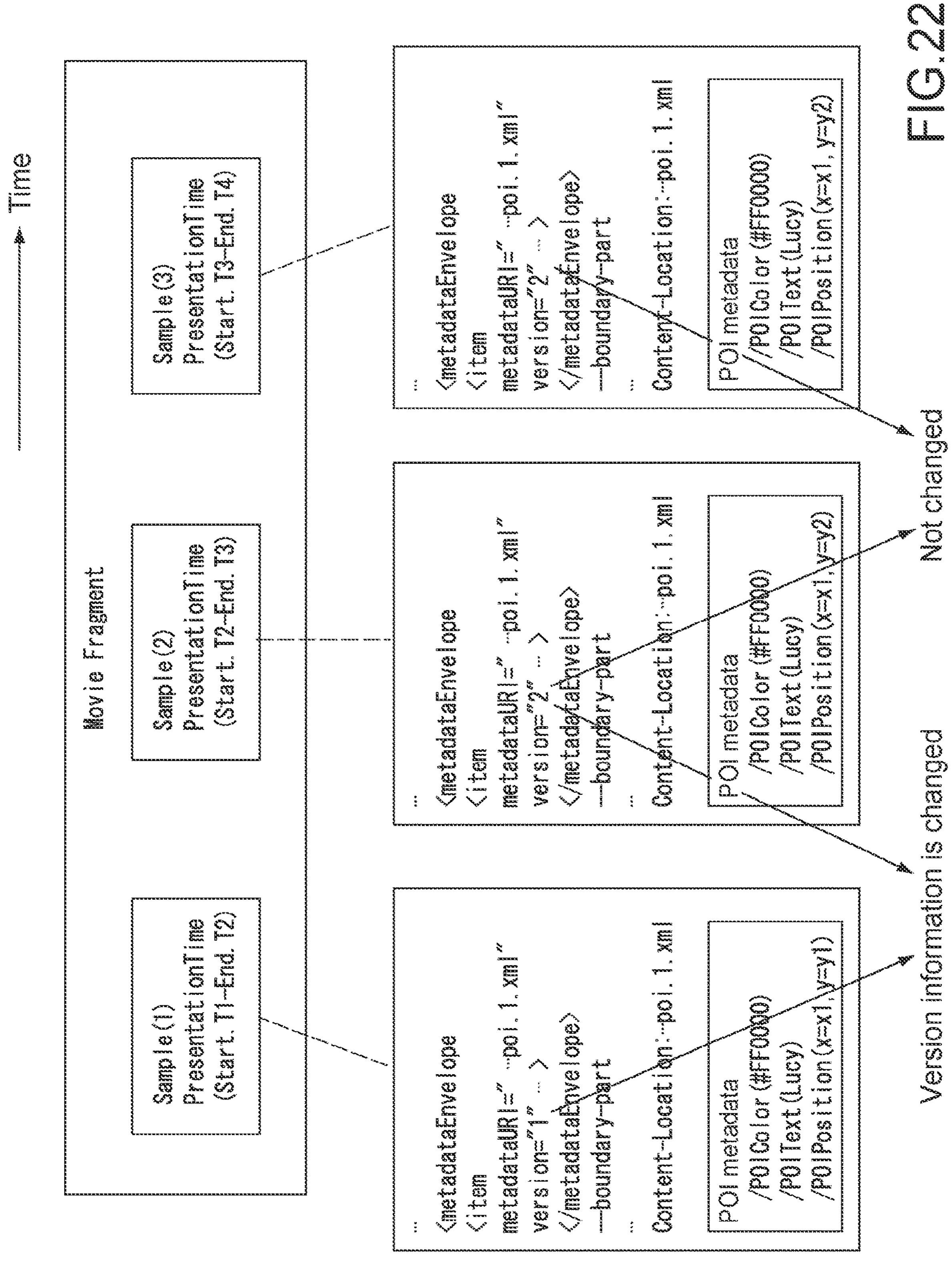
FIG. 22 is a diagram for describing presentation updating control across a plurality of sample times of the POI metadata.

It has been assumed hereinabove that the presentation control for additional images is performed while associating the video of each Sample with the POI metadata one-on-one, but one piece of POI metadata may be applied to the video of a plurality of continuous Samples. In this case, as shown in FIG. 22, version information (Version) is added to a value of an identifier (metadataURI) of the POI metadata described in the packages 66, 67, and 68 storing files 63, 64, and 65 of the POI metadata. In a case where the details are not changed from the immediately preceding POI metadata, the version information is assumed to have the same value as the version information described in a package storing the immediately preceding POI metadata, and in a case where the details are changed from the immediately preceding POI metadata, the version information is set to an incremented value.

Thus, in switching between Samples of the video, in a case where a value of each piece of version information is changed before and after the switching, the application of the application execution environment 43 performs computation for the presentation for additional images based on the POI metadata, and in a case where a value of each piece of version information is not changed, the additional image is continued to be presented without performing anew computation for the presentation for additional images based on the POI metadata. This allows the load of computation for the presentation for additional images to be reduced.

For example, as shown in FIG. 22, the value of the version information added to the identifier (metadataURI) of the POI metadata (1) corresponding to the video of Sample (1) is "1", the value of the version information added to the identifier (metadataURI) of the POI metadata (2) corresponding to the video of the second Sample (2) is "2", and the value of the version information added to the identifier (metadataURI) of the POI metadata (3) corresponding to the video of the third Sample (3) is "2". In this case, in switching between the video of the second Sample (2) and the video of the third Sample (3), the additional image added to the video of the second Sample (2) is continued to be presented as it is also on the video of the third Sample (3) without performing computation for the presentation for additional images on the basis of the POI metadata (3) corresponding to the video of the third Sample (3).

Note that the present technology is not limited to the embodiment described above and can be variously modified without departing from the gist of the present invention as a matter of course.

The present technology can have the following configurations.

(1) An information processing apparatus, including:

a media reproduction unit that acquires and reproduces video data including a service object, for which a service that processes a request from a user through voice is available; and a controller that adds an additional image for informing the user about the service object to the reproduced video.

(2) The information processing apparatus according to (1), in which the additional image includes a visual feature unique to each service object such that the service object is uniquely determined by voice recognition in the service.

(3) The information processing apparatus according to any one of (1) and (2), in which the additional image is presented at a position attached to the service object.

(4) The information processing apparatus according to any one of (1) to (3), in which the controller is configured to restrict the service object, to which the additional image is added, in accordance with the user or an attribute of the user.

(5) The information processing apparatus according to any one of (1) to (4), in which the controller is configured to perform a skip reproduction of a video of a period in which the service object appears, the additional image being added to the service object in accordance with the user or the attribute of the user.

(6) The information processing apparatus according to any one of (1) to (4), in which the controller is configured to reproduce the video of the period in which the service object appears, at a first double-speed, the additional image being added to the service object in accordance with the user or the attribute of the user, and reproduce a video of a period in which the service object does not appear, at a second speed faster than the first double-speed.

(7) The information processing apparatus according to any one of (1) to (6), in which the controller is configured to acquire metadata for generating the additional information, and add the additional information on the basis of the acquired metadata.

(8) The information processing apparatus according to any one of (1) to (7), in which the controller is configured to acquire a web application for processing the metadata, and process the metadata in accordance with the acquired web application.

(9) The information processing apparatus according to any one of (1) to (8), in which the controller is configured to acquire an MPD file including AdaptationSet of the metadata, analyze the MPD file, acquire each of the video data and the metadata as a Media Segment of MPEG-DASH, and present the video data and the additional image based on the metadata in synchronization with each other.

(10) The information processing apparatus according to any one of (1) to (9), in which the controller is configured to determine whether a change in details is present or not between temporally preceding metadata and temporally succeeding metadata on the basis of version information of the metadata, and in a case where a change in details is absent, add the additional image, which is added to the video on the basis of the temporally preceding metadata, to a video synchronized with the temporally succeeding metadata, as an additional image based on the temporally succeeding metadata.

(11) The information processing apparatus according to any one of (1) to (10), in which the visual feature of the additional image is provided by any one of a character string regarding the service object, a color, a shape, or an icon.

(12) An information processing method, including:

acquiring and reproducing video data including a service object, for which a service that processes a request from a user through voice is available; and adding an additional image for informing the user about the service object to the reproduced video.

(13) The information processing method according to (12), in which the additional image includes a visual feature unique to each service object such that the service object is uniquely determined by voice recognition in the service.

(14) The information processing method according to (12) or (13), in which the additional image is presented at a position attached to the service object.

(15) The information processing method according to any one of (12) to (14), in which the service object, to which the additional image is added, is restricted in accordance with the user or an attribute of the user.

(16) The information processing method according to any one of (12) to (15), in which a skip reproduction of a video of a period in which the service object appears is performed, the additional image being added to the service object in accordance with the user or the attribute of the user.

(17) The information processing method according to any one of (12) to (15), in which the video of the period in which the service object appears is reproduced at a first double-speed, the additional image being added to the service object in accordance with the user or the attribute of the user, and a video of a period in which the service object does not appear is reproduced at a second speed faster than the first double-speed.

(18) The information processing method according to any one of (12) to (17), in which metadata for generating the additional information is acquired, and the additional information is added on the basis of the acquired metadata.

(19) The information processing method according to any one of (12) to (18), in which a web application for processing the metadata is acquired, and the metadata is processed in accordance with the acquired web application.

(20) The information processing method according to any one of (12) to (19), in which an MPD file including AdaptationSet of the metadata is acquired, the MPD file is analyzed, each of the video data and the metadata is acquired as a Media Segment of MPEG-DASH, and the video data and the additional image based on the metadata are presented in synchronization with each other.

(21) The information processing method according to any one of (12) to (20), in which whether a change in details is present or not between temporally preceding metadata and temporally succeeding metadata is determined on the basis of version information of the metadata, and in a case where a change in details is absent, the additional image, which is added to the video on the basis of the temporally preceding metadata, is added to a video synchronized with the temporally succeeding metadata, as an additional image based on the temporally succeeding metadata.

(22) The information processing method according to any one of (12) to (21), in which the visual feature of the additional image is provided by any one of a character string regarding the service object, a color, a shape, or an icon.

(23) A program causing a computer to function to, when the computer reproduces video data including a service object, for which a service that processes a request from a user through voice is available, add an additional image for informing the user about the service object to the reproduced video.

(24) The program according to (23), in which the additional image includes a visual feature unique to each service object such that the service object is uniquely determined by voice recognition in the service.

(25) The program according to (23) or (24), in which the additional image is presented at a position attached to the service object.

(26) The program according to any one of (23) to (25), in which the controller restricts the service object, to which the additional image is added, in accordance with the user or an attribute of the user.

(27) The program according to any one of (23) to (26), in which the controller performs a skip reproduction of a video of a period in which the service object appears, the additional image being added to the service object in accordance with the user or the attribute of the user.

(28) The program according to any one of (23) to (26), in which the controller reproduces the video of the period in which the service object appears, at a first double-speed, the additional image being added to the service object in accordance with the user or the attribute of the user, and reproduces a video of a period in which the service object does not appear, at a second speed faster than the first double-speed.

(29) The program according to any one of (23) to (28), in which the controller acquires metadata for generating the additional information, and adds the additional information on the basis of the acquired metadata.

(30) The program according to any one of (23) to (28), in which the controller determines whether a change in details is present or not between temporally preceding metadata and temporally succeeding metadata on the basis of version information of the metadata, and in a case where a change in details is absent, adds the additional image, which is added to the video on the basis of the temporally preceding metadata, to a video synchronized with the temporally succeeding metadata, as an additional image based on the temporally succeeding metadata.

(31) The program according to any one of (23) to (29), in which the visual feature of the additional image is provided by any one of a character string regarding the service object, a color, a shape, or an icon.

REFERENCE SIGNS LIST

4 information processing apparatus
11 moving image content server
12 application server
13 POI metadata server
41 AV decoder
42 POI metadata processing module
43 application execution environment
44 renderer
45 display
46 speaker
47 user determination module

The invention claimed is:

1. An information processing apparatus, comprising:

a display; and circuitry configured to reproduce video data including a plurality of service objects, acquire a media presentation description (MPD) of a dynamic adaptive streaming over HTTP (DASH), wherein the MPD includes metadata for generating an image including at least a visual feature, each visual feature including a caption and being related to a service object of the plurality of service objects, wherein the caption includes a name of people appearing in the reproduced video data and being associated with the visual feature, the name serving as a voice-recognition identifier to determine the service object, and present the image on a video associated with a content of the video data, wherein the image enables a voice recognition of a name included in a caption to determine a service object among the plurality of service objects, wherein the image and the video data are presented in synchronization with each other, in accordance with the metadata, wherein each visual feature is presented at an offset position attached to a related service object, a position of the visual feature in the image being determined in accordance with the metadata, and wherein a number of service objects among the plurality of service objects, for which a related visual featured is presented, is restricted in accordance with an attribute of a user.

2. The information processing apparatus according to claim 1, wherein the metadata includes resource information of a content, and the image is presented based on the resource information.

3. The information processing apparatus according to claim 1, wherein the circuitry is configured to present the image in accordance with a native application or a web application.

4. The information processing apparatus according to claim 1, wherein the circuitry is configured to perform a skip reproduction of the video of a period in which the service object appears.

5. The information processing apparatus according to claim 4, wherein the circuitry is configured to reproduce the video of the period in which the service object appears, at a first speed, and reproduce the video of a period in which the service object does not appear, at a second speed faster than the first speed.

6. The information processing apparatus according to claim 1, wherein the circuitry is configured to determine whether a change in details is present or not between temporally preceding metadata and temporally succeeding metadata on a basis of version information of the metadata, and in a case where a change in details is absent, add the image, which is added to the video on a basis of the temporally preceding metadata, to a video synchronized with the temporally succeeding metadata, as an additional image based on the temporally succeeding metadata.

7. The information processing apparatus according to claim 1, wherein a visual feature included in the image is provided by any one of a character string regarding the service object, a color, a shape, or an icon.

8. The information processing apparatus according to claim 1, wherein the information processing apparatus is a television.

9. The information processing apparatus according to claim 1, wherein the circuitry is configured to add the image to the video by superimposing the image onto each frame of the video including the service object.

10. The information processing apparatus according to claim 1, wherein the circuitry is configured to add the image to the video such that the image is positioned in the video in accordance with a position of the service object in the video.

11. The information processing apparatus according to claim 1, wherein the image enables a voice recognition to determine a service request associated with the service object among the plurality of service objects.

12. An information processing method for an information processing apparatus, comprising:

reproducing video data including a plurality of service objects, acquiring a media presentation description (MPD) of a dynamic adaptive streaming over HTTP (DASH), wherein the MPD includes metadata for generating an image including at least a visual feature, each visual feature being a caption and being related to a service object of the plurality of service objects, wherein the caption includes a name of people appearing in the reproduced video data and being associated with the visual feature, the name serving as a voice-recognition identifier to determine the service object, and presenting the image on a video associated with a content of the video data, wherein the image enables a voice recognition of a name included in a caption to determine a service object among the plurality of service objects, wherein the image and the video data are presented in synchronization with each other, in accordance with the metadata, wherein the visual feature is presented at an offset position attached to the service object, a position of the visual feature in the image being determined in accordance with the metadata, and wherein a number of service objects among the plurality of service objects, for which a related visual featured is presented, is restricted in accordance with an attribute of a user.

13. The information processing method according to claim 12, wherein the metadata includes resource information of a content, and the image is presented based on the resource information.

14. The information processing method according to claim 12, wherein the method further comprises presenting the image in accordance with a native application or a web application.

15. The information processing method according to claim 12, wherein the method further comprises performing a skip reproduction of the video of a period in which the service object appears.

16. The information processing method according to claim 12, wherein the image enables a voice recognition to determine a service request associated with the service object among the plurality of service objects.

17. The information processing method according to claim 12, wherein a visual feature included in the image is provided by any one of a character string regarding the service object, a color, a shape, or an icon.

18. The information processing method according to claim 12, wherein the method further comprises adding the image to the video by superimposing the image onto each frame of the video including the service object.

19. A non-transitory computer medium having stored thereon a program that when executed by a computer causes the computer to implement a method comprising:

reproducing video data including a plurality of service objects, acquiring a media presentation description (MPD) of a dynamic adaptive streaming over HTTP (DASH), wherein the MPD includes metadata for generating an image including at least a visual feature, each visual feature including a caption and being related to a service object of the plurality of service objects, wherein the caption includes a name of people appearing in the reproduced video data and being associated with the visual feature, the name serving as a voice-recognition identifier to determine the service object, and presenting the image on a video associated with a content of the video data, wherein the image enables a voice recognition of a name included in a caption to determine a service object from among the plurality of service objects, wherein the image and the video data are presented in synchronization with each other, in accordance with the metadata, wherein each visual feature is presented at an offset position attached to a related service object, a position of the visual feature in the image being determined in accordance with the metadata, and wherein a number of service objects among the plurality of service objects, for which a related visual featured is presented, is restricted in accordance with an attribute of a user.

* * * * *